(12) United States Patent
Sanchez et al.

(10) Patent No.: US 10,427,069 B2
(45) Date of Patent: *Oct. 1, 2019

(54) PROCESS FOR UPGRADING BIOMASS DERIVED PRODUCTS USING LIQUID-LIQUID EXTRACTION

(71) Applicant: Inaeris Technologies, LLC, Pasadena, TX (US)

(72) Inventors: Vicente Sanchez, Houston, TX (US); Richard Engelman, Houston, TX (US); J. Christopher Lewis, Houston, TX (US); Brent Moore, Friendswood, TX (US); Edward J. Smith, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/207,134

(22) Filed: Jul. 11, 2016

(65) Prior Publication Data

US 2016/0317947 A1 Nov. 3, 2016

Related U.S. Application Data

(63) Continuation-in-part of application No. 13/889,105, filed on May 7, 2013, now Pat. No. 9,387,415, which (Continued)

(51) Int. Cl.
| | |
|---|---|
| *B01D 11/04* | (2006.01) |
| *B01D 17/02* | (2006.01) |
| *C10G 29/06* | (2006.01) |
| *C10G 21/16* | (2006.01) |
| *C10G 29/10* | (2006.01) |
| *C10G 29/20* | (2006.01) |
| *C10G 21/28* | (2006.01) |
| *C10B 53/02* | (2006.01) |
| *B01D 61/14* | (2006.01) |
| *B01D 17/04* | (2006.01) |
| *C10G 29/22* | (2006.01) |
| *C10G 33/04* | (2006.01) |
| *C10G 3/00* | (2006.01) |

(Continued)

(52) U.S. Cl.
CPC ...... *B01D 11/0446* (2013.01); *B01D 11/0415* (2013.01); *B01D 11/0492* (2013.01); *B01D 17/0208* (2013.01); *B01D 17/042* (2013.01); *B01D 17/044* (2013.01); *B01D 17/047* (2013.01); *B01D 61/147* (2013.01); *C10G 1/002* (2013.01); *C10G 1/08* (2013.01); *C10G 3/40* (2013.01); *C10G 3/42* (2013.01); *C10G 21/06* (2013.01); *C10G 21/16* (2013.01); *C10G 21/28* (2013.01); *C10G 29/06* (2013.01); *C10G 29/10* (2013.01); *C10G 29/20* (2013.01); *C10G 29/22* (2013.01); *C10G 33/04* (2013.01); *C10B 53/02* (2013.01); *C10G 2300/1011* (2013.01); *C10G 2300/308* (2013.01); *Y02P 30/20* (2015.11)

(58) Field of Classification Search
CPC ........ B01D 12/00; B01D 12/02; B01D 17/02; B01D 17/0208; B01D 17/024; B01D 17/042; B01D 17/044; B01D 17/047; B01D 21/00; B01D 36/00; B01D 37/00; B01D 11/04; B01D 11/0488; B01D 11/0492; B01D 11/0446; B01D 61/147; B01D 11/0415; C10G 3/40; C10G 3/42; C10G 29/06; C10G 29/10; C10G 29/20; C10G 29/22; C10G 2300/1011; C10G 2300/308; C10G 21/16; C10G 33/04; C10G 21/06; C10G 1/08; C10G 1/002; C10G 21/28; C10G 3/44; C10G 2300/1014; C10G 2300/44; C07C 1/20; C07C 7/005; C07C 7/001; Y02P 30/20; C10B 53/02; C10L 2200/0461; C10L 2200/0469; C10L 2200/0484

USPC ....... 210/634, 639, 808, 773, 774, 800, 804, 210/749; 44/307, 605, 606; 435/135, 435/161–165

See application file for complete search history.

(56) References Cited

U.S. PATENT DOCUMENTS

| 4,147,593 A | 3/1979 | Frischmuth et al. |
| 4,209,647 A | 6/1980 | Gallivan et al. |

(Continued)

FOREIGN PATENT DOCUMENTS

| CN | 101144025 | 3/2009 |
| CN | 101824330 | 9/2010 |

(Continued)

OTHER PUBLICATIONS

J. A. Dumesic et al, "Liquid-Phase Catalytic Processing of Biomass-Derived Oxygenated Hydrocarbons to Fuels and Chemicals", Angewandte Chemie Int. Ed., Published 2007, vol. 46, pp. 7164-7183.*

(Continued)

*Primary Examiner* — Joseph W Drodge
(74) *Attorney, Agent, or Firm* — Dunlap Codding, P.C.

(57) ABSTRACT

Disclosed is a process for the alteration of the ratio of the specific gravities of the oil and water phases resulting from the conversion of biomass to liquid products, the reduction of the conductivity and of metals of the product mixture, which each can aid in the removal of solids contained in the oil phase; and a liquid-liquid extraction method for partitioning desirable carbon containing compounds into the oil phase and undesirable carbon containing compounds into the water phase.

29 Claims, No Drawings

Related U.S. Application Data is a continuation-in-part of application No. 13/212,861, filed on Aug. 18, 2011, now Pat. No. 9,315,739.

(51) Int. Cl.
  *C10G 1/00* (2006.01)
  *C10G 1/08* (2006.01)
  *C10G 21/06* (2006.01)

(56) References Cited

U.S. PATENT DOCUMENTS

| | | |
|---|---|---|
| 4,222,845 A | 9/1980 | Schmid |
| 4,304,649 A | 8/1981 | Han et al. |
| 4,299,690 A | 10/1981 | Allan |
| 4,396,487 A | 2/1983 | Strumskis |
| 4,405,448 A | 9/1983 | Googin et al. |
| 4,512,239 A | 4/1985 | Watanabe et al. |
| 4,551,239 A | 11/1985 | Merchant et al. |
| 4,645,585 A | 2/1987 | White |
| 4,723,963 A | 2/1988 | Taylor |
| 4,795,841 A | 1/1989 | Elliot et al. |
| 4,942,269 A | 7/1990 | Chum et al. |
| 4,960,507 A | 10/1990 | Evans et al. |
| 5,104,545 A | 4/1992 | Means et al. |
| 5,223,601 A | 6/1993 | Chum et al. |
| 5,395,455 A | 3/1995 | Scott et al. |
| 5,792,340 A | 8/1998 | Freel et al. |
| 5,820,640 A | 10/1998 | Ikura et al. |
| 5,877,380 A | 3/1999 | Conroy et al. |
| 5,882,506 A | 3/1999 | Ohsol et al. |
| 5,922,206 A | 7/1999 | Darlington, Jr. et al. |
| 6,007,702 A | 12/1999 | Schievelbein |
| 6,172,272 B1 | 1/2001 | Shabtai et al. |
| 6,602,404 B2 | 8/2003 | Walsh et al. |
| 6,814,940 B1 | 11/2004 | Hiltunen et al. |
| 6,830,597 B1 | 12/2004 | Green |
| 7,004,999 B2 | 2/2006 | Johnson et al. |
| 7,262,331 B2 | 8/2007 | Van de Beld et al. |
| 7,279,018 B2 | 10/2007 | Jakkula et al. |
| 7,300,568 B2 | 11/2007 | Ketley et al. |
| 7,311,739 B2 | 12/2007 | Bongart et al. |
| 7,319,168 B2 | 1/2008 | Sanada |
| 7,425,657 B1 | 9/2008 | Elliot et al. |
| 7,501,054 B2 | 3/2009 | Galiasso |
| 7,501,374 B2 | 3/2009 | Galiasso |
| 7,578,927 B2 | 9/2009 | Burke et al. |
| 7,638,314 B2 | 12/2009 | Zappt et al. |
| 7,781,191 B2 | 8/2010 | Dunson, Jr. et al. |
| 7,816,570 B2 | 10/2010 | Roberts, IV et al. |
| 7,819,903 B2 | 10/2010 | Adams et al. |
| 7,861,696 B2 | 1/2011 | Lund |
| 7,883,882 B2 | 2/2011 | Franklin et al. |
| 7,888,540 B2 | 2/2011 | Deluga et al. |
| 7,892,300 B2 | 2/2011 | Galiasso |
| 8,075,642 B2 | 12/2011 | Dumesic et al. |
| 8,083,900 B2 | 12/2011 | Lin |
| 8,097,172 B2 | 1/2012 | Islam et al. |
| 8,101,808 B2 | 1/2012 | Evanko et al. |
| 8,158,842 B2 | 4/2012 | McCall |
| 8,192,628 B2 * | 6/2012 | Cranford .................. C11B 1/02 210/639 |
| 8,202,332 B2 | 6/2012 | Agblevor |
| 8,236,173 B2 | 8/2012 | Bartek et al. |
| 8,236,977 B2 | 8/2012 | Woods et al. |
| 8,329,967 B2 | 12/2012 | Brandvold et al. |
| 8,329,969 B2 | 12/2012 | McCall et al. |
| 8,377,152 B2 | 2/2013 | Ramirez Corredores et al. |
| 8,454,712 B2 | 6/2013 | Ramirez Corredores et al. |
| 8,506,658 B2 | 8/2013 | Corredores et al. |
| 8,519,203 B2 | 8/2013 | Marinangeli et al. |
| 8,545,581 B2 | 10/2013 | Agblevor |
| 8,598,378 B2 | 12/2013 | Cooney et al. |
| 8,628,589 B2 | 1/2014 | Ramirez Corredores et al. |
| 8,669,405 B2 | 3/2014 | Ramirez Corredores et al. |
| 8,853,484 B2 | 10/2014 | Ramirez Corredores et al. |
| 8,979,955 B2 | 3/2015 | Agblevor et al. |
| 9,206,365 B2 | 12/2015 | Ramirez Corredores et al. |
| 9,315,739 B2 * | 4/2016 | Smith .................. C10G 29/06 |
| 9,382,489 B2 | 7/2016 | Ramirez Corredores et al. |
| 9,387,415 B2 * | 7/2016 | Sanchez ............ B01D 11/0492 |
| 2003/0115792 A1 | 6/2003 | Shabtai et al. |
| 2003/0207407 A1 | 6/2003 | Buchanan et al. |
| 2004/0055209 A1 | 3/2004 | Jakkula et al. |
| 2004/0111955 A1 | 6/2004 | Mullay et al. |
| 2006/0041152 A1 | 2/2006 | Cantrell et al. |
| 2006/0070912 A1 | 4/2006 | Khan |
| 2006/0161032 A1 | 7/2006 | Murzin et al. |
| 2007/0007188 A1 | 1/2007 | Skrypski-Mantele et al. |
| 2007/0161095 A1 | 7/2007 | Gurin |
| 2007/0260102 A1 | 8/2007 | Santiago et al. |
| 2007/0261296 A1 | 11/2007 | Adams et al. |
| 2008/0006520 A1 | 1/2008 | Badger et al. |
| 2008/0172931 A1 | 4/2008 | Cortright et al. |
| 2008/0300434 A1 | 4/2008 | Cortright et al. |
| 2008/0050795 A1 | 7/2008 | Mansson et al. |
| 2008/0217211 A1 | 9/2008 | Chornet et al. |
| 2008/0264771 A1 | 10/2008 | Dam-Johansen et al. |
| 2008/0312476 A1 | 12/2008 | McCall |
| 2009/0000185 A1 | 1/2009 | Aulich et al. |
| 2009/0007484 A1 | 1/2009 | Smith |
| 2009/0054711 A1 | 2/2009 | Lawrence et al. |
| 2009/0065378 A1 | 3/2009 | Maas |
| 2009/0119979 A1 | 5/2009 | Mullen |
| 2009/0124839 A1 | 5/2009 | Dumesic et al. |
| 2009/0126260 A1 * | 5/2009 | Aravanis ................ C07C 4/06 44/308 |
| 2009/0139851 A1 | 6/2009 | Freel |
| 2009/0151233 A1 | 6/2009 | Miller |
| 2009/0165378 A1 | 7/2009 | Agblevor |
| 2009/0166256 A1 | 7/2009 | Lewis et al. |
| 2009/0182064 A1 | 7/2009 | Griffin |
| 2009/0182166 A1 | 7/2009 | Kubatova et al. |
| 2009/0182199 A1 | 7/2009 | Rudischhauser et al. |
| 2009/0227823 A1 | 9/2009 | Huber et al. |
| 2009/0229173 A1 | 9/2009 | Gosling |
| 2009/0234030 A1 | 9/2009 | Gouman et al. |
| 2009/0234146 A1 | 9/2009 | Cooney et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0259082 A1 | 10/2009 | Deluga et al. |
| 2009/0294324 A1 | 12/2009 | Brandvold et al. |
| 2009/0301930 A1 | 12/2009 | Brandvold et al. |
| 2009/0318737 A1 | 12/2009 | Luebke |
| 2010/0002792 A1 | 1/2010 | Seyedi-Esfahani |
| 2010/0064574 A1 | 3/2010 | de Almeida et al. |
| 2010/0076238 A1 | 3/2010 | Brandvold et al. |
| 2010/0135734 A1 | 3/2010 | de Almeida et al. |
| 2010/0083566 A1 | 4/2010 | Fredriksen et al. |
| 2010/0105970 A1 | 4/2010 | Yanik et al. |
| 2010/0137662 A1 | 6/2010 | Sechrist et al. |
| 2010/0145117 A1 * | 6/2010 | Seames ................ C10G 3/00 585/240 |
| 2010/0162625 A1 | 7/2010 | Mills |
| 2010/0212215 A1 | 8/2010 | Agblevor |
| 2010/0218417 A1 | 9/2010 | Bauldreay et al. |
| 2010/0256428 A1 | 10/2010 | Marker et al. |
| 2010/0296997 A1 * | 11/2010 | Parker ................ C01B 3/24 423/449.9 |
| 2010/0330615 A1 * | 12/2010 | Neto ................ C11B 1/10 435/42 |
| 2011/0003218 A1 | 1/2011 | Stolte et al. |
| 2011/0068049 A1 | 3/2011 | Garcia, III et al. |
| 2011/0083360 A1 * | 4/2011 | Poenie ................ C10L 1/026 44/307 |
| 2011/0083998 A1 | 4/2011 | Hamper et al. |
| 2011/0126449 A1 | 6/2011 | Xu et al. |
| 2011/0138681 A1 | 6/2011 | Ramirez Corredores et al. |
| 2011/0139262 A1 | 6/2011 | Aburto Anell et al. |
| 2011/0139602 A1 | 6/2011 | Lin et al. |
| 2011/0146140 A1 | 6/2011 | Brandvold et al. |
| 2011/0155631 A1 | 6/2011 | Knuuttila et al. |
| 2011/0192072 A1 | 8/2011 | Steele et al. |

(56) References Cited

U.S. PATENT DOCUMENTS

| | | | |
|---|---|---|---|
| 2011/0195485 A1* | 8/2011 | Kale | C11B 1/10 435/262 |
| 2011/0245489 A1 | 10/2011 | Steele et al. | |
| 2011/0259793 A1 | 10/2011 | Umansky et al. | |
| 2011/0282118 A1 | 11/2011 | Shih | |
| 2012/0000821 A1 | 1/2012 | Yang et al. | |
| 2012/0005949 A1 | 1/2012 | Stevens et al. | |
| 2012/0053357 A1 | 3/2012 | Kale | |
| 2012/0101317 A1 | 4/2012 | Knight et al. | |
| 2012/0101318 A1 | 4/2012 | Ramirez Corredores et al. | |
| 2012/0144730 A1 | 6/2012 | Stamires et al. | |
| 2012/0151827 A1 | 6/2012 | Powell et al. | |
| 2012/0172643 A1 | 7/2012 | Ramirez Corredores et al. | |
| 2012/0190872 A1* | 7/2012 | Cranford | C11B 1/02 554/207 |
| 2012/0204479 A1 | 8/2012 | Ramirez Corredores et al. | |
| 2012/0204481 A1 | 8/2012 | Corredores et al. | |
| 2012/0216448 A1 | 8/2012 | Ramirez Corredores et al. | |
| 2012/0289440 A1 | 11/2012 | Pollard et al. | |
| 2012/0302765 A1 | 11/2012 | Dumesic | |
| 2012/0302767 A1 | 11/2012 | Dumesic | |
| 2013/0004646 A1 | 1/2013 | Franklin et al. | |
| 2013/0023706 A1 | 1/2013 | Huber et al. | |
| 2013/0035502 A1 | 2/2013 | Cohen et al. | |
| 2013/0043192 A1 | 2/2013 | Smith et al. | |
| 2013/0090502 A1 | 4/2013 | Laakkonen et al. | |
| 2013/0140216 A1 | 6/2013 | Wickes et al. | |
| 2013/0144089 A1 | 6/2013 | Fjare et al. | |
| 2013/0152454 A1 | 6/2013 | Baird et al. | |
| 2013/0014431 A1 | 7/2013 | Jin et al. | |
| 2013/0174476 A1 | 7/2013 | Ramirez Corredores et al. | |
| 2013/0184505 A1 | 7/2013 | Maxwell et al. | |
| 2013/0291431 A1 | 11/2013 | Steele et al. | |
| 2013/0305594 A1* | 11/2013 | Shuai | C10L 1/04 44/330 |
| 2013/0326936 A1 | 12/2013 | Ramirez Corredores et al. | |
| 2014/0256965 A1 | 9/2014 | Asikkala et al. | |
| 2014/0261715 A1 | 9/2014 | Abhari et al. | |
| 2014/0288338 A1 | 9/2014 | Radlein et al. | |
| 2015/0057475 A1 | 2/2015 | Wang et al. | |
| 2015/0184098 A1 | 7/2015 | Talwar | |

FOREIGN PATENT DOCUMENTS

| | | |
|---|---|---|
| CN | 101875846 | 11/2010 |
| EP | 293069 | 6/1991 |
| EP | 0513051 | 8/1991 |
| EP | 718392 | 9/1999 |
| EP | 1452579 | 9/2004 |
| EP | 1719811 | 11/2006 |
| EP | 1741768 | 1/2007 |
| EP | 215456 | 9/2009 |
| EP | 2107100 | 10/2009 |
| EP | 2226375 | 9/2010 |
| EP | 2236584 | 10/2010 |
| EP | 2325281 | 5/2011 |
| GB | 2399571 | 9/2004 |
| KR | 100857247 B1 | 9/2008 |
| WO | 2000071494 | 11/2000 |
| WO | 2001007537 | 2/2001 |
| WO | 2005102936 | 11/2005 |
| WO | 2006037368 | 4/2006 |
| WO | 2007128798 | 11/2007 |
| WO | 2007128800 | 11/2007 |
| WO | 2008020167 | 2/2008 |
| WO | 2009014859 | 1/2009 |
| WO | 2009071495 | 6/2009 |
| WO | 2009082366 | 7/2009 |
| WO | 2009111026 | 9/2009 |
| WO | 2009115888 | 9/2009 |
| WO | 2009126508 | 10/2009 |
| WO | 2009130392 | 10/2009 |
| WO | 2010002792 | 1/2010 |
| WO | 2010002886 | 1/2010 |
| WO | 2010008686 | 1/2010 |
| WO | 2010033512 | 3/2010 |
| WO | 2010033789 | 3/2010 |
| WO | 2010068809 | 6/2010 |
| WO | 2010088486 | 8/2010 |
| WO | 2010124069 | 10/2010 |
| WO | 2010135734 | 11/2010 |
| WO | 2011069510 | 6/2011 |
| WO | 2011096912 | 8/2011 |
| WO | 2011143396 | 11/2011 |
| WO | 2012035410 | 3/2012 |
| WO | 2012027986 | 5/2012 |
| WO | 2014182499 | 11/2014 |
| WO | 2016107824 | 7/2016 |

OTHER PUBLICATIONS

Kunkes et al, "Catalytic Conversion of Biomass to Monfunctional Hydrocarbons and Targeted Liquid-Fuel Classes", Science, vol. 322, pp. 417-421, Published online Sep. 18, 2008.*

International Search Report and Written Opinion, dated Oct. 23, 2017, for PCT Application No. PCT/US2017/041547.

Wei, Yi et al., Liquid-Liquid Extraction of Biomass Pyrolysis Bio-Oil. Energy & Fuels, Jan. 29, 2014, vol. 28, pp. 1207-1212.

CN201280008458.0, Chinese Office Action, dated Sep. 17, 2014, 8 pages.

CN201280008458.0, Chinese Office Action, dated Apr. 29, 2015, 3 pages.

EP12745278.7, European Extended Search Report and Written Opinion, dated Dec. 21, 2016.

EP12824005.8—Supplementary European Search Report, dated Nov. 19, 2015.

EP14794254.4—Extended European Search Report, dated Dec. 23, 2016.

Molina, et al. "Cyclopentyl Methyl Ther: A Green Co-Solvent for the Selective Dehyrdation of Lignocellulosic Pentoses to Furfural", Bioresource Technology, vol. 126, Dec. 1, 2012, pp. 321-327,XP055155008, ISSN: 0960-8524, DIO:10,1016/j.biortech.2012.09.049.

Moreau et al, "Dehydration of Fructose to 5-Hydroxmethylfurfural Over H-Mordenites", applied Catalysis A: General, Elsevier, Amsterdam, NL, vol. 145, No. 1-2, Oct. 8, 1996, pp. 211-224, XP022250817, ISSN: 0926-860X, DIO: 10.1016/0926-860X (96) 00136-6.

A.V. Bridgewater, "Fast Pyrolysis Processes for Biomass, Renewable and Sustainable Energy Reviews", vol. 4, pp. 1-73 (2000).

Beis et al., "Fixed-Bed Pyrolysis of Safflower Seed: Influence of Pyrolysis Parameters on Product Yields and Compositions", Renewable Energy, Issue 26, 2002, pp. 21-32.

Li, et al., "Analysis of Upgrading of Bio-Petroleum From Biomass by Direct Deoxy-Liquefaction", Journal of Analytical and Applied Pyrolysis, Issue 81, 2008, pp. 199-204.

Ozbay et al., "Comparative Analysis of Pyrolysis Oils and Its Subfractions Under Different Atmospheric Conditions", Fuel Processing Technology, Issue 87 2006, pp. 1013-1019.

Sanchez, et al., "Renewable Fuel Bi-Products Potential Use in Asphalt", 2012 aapt Annual Meeting Presentation, KiOR, Inc., Texas 2012.

Wang et al., "Comparative Studies of Products Produced From Four Different Biomass Samples Via Deoxy-Liquefaction", Bioresource Technology, Issue 99, 2008, pp. 2778-2786.

PCT/US2014/048648—International Search Report and Written Opinion, dated Dec. 3, 2014.

PCT/US2015/01160—International Search Report and Written Opinion, dated Apr. 14, 2015.

EP11836833.1—European Search Report, dated Jul. 16, 2014.

U.S. Appl. No. 13/964,873, filed Aug. 12, 2013; Inventor: Ramirez-Corredores et al.

Adjaye et al., "Production of Hydrocarbons by Catalytic Upgrading of a Fast Pyrolysis Bio-Oil. Part 1: Conversion Over Various Catalysts", Fuel Processing Technology, vol. 45, pp. 161-183, 1995, 23 pages.

(56) References Cited

OTHER PUBLICATIONS

Adjaye et al., "Production of Hydrocarbons by Catalytic Upgrading of a Fast Pyrolysis Bio-Oil. Part 2: Comparative Catalytic Performance and Reaction Pathways", Fuel Processing Technology, vol. 45, pp. 185-202, 18 pages.
Bain, "Biodiesel and Other Renewable Diesel Fuels", National Renewable Energy Laboratory, Nov. 2006.
Bridgewater et al., "An Overview of Fast Pyrolysis of Biomass", Organic Geochemistry, 40, 1999, 1479-1493.
Chevron Diesel Technical Fuel Review (2007).
Chiaramonti, et al. "Development of Emulsions From Biomass Pyrolysis Liquid and Diesel and Their Use in Engines, Part 1: Emulsion Production" Biomass & BioEnergy 25 (2003) 85-99.
Czernik, et al. "Overvview of Applications of Biomass Fast Pyrolysis Oil" Energy & Fuels 2004, 18, 590-598.
Czernik, et al. "Stability of Woods Fast Pyrolysis Oil" Biomass and Bioenergy, vol. 7, Nos. 1-6, pp. 187-192, 1994, Great Britain.
Deng, "A Study on Relationship Between the Compositions and Properties of Fuel and Emissions From Diesel Engine With Fuzzy—Gray Theory", E3 Journal of Energy Oil and Gas Research , vol. 1 (1) Mar. 2012.
Diebold et al. "Additivies to Lower and Stabilize the Viscosity of Pyrolysis Oils During Storage", American Chemical Society Publications, National Renewable Energy Laboratroy, Golden Colorado, Energy Fuels, 1997, vol. 11, Issue 5, pp. 1081-1091, 3 pages, Abstract Only.
Diebold, "A Review of the Chemical and Physical Mechanisms of the Storage Stability of Fast Pyrolysis Bio-Oils" NREL/SR-270-27613, Jan. 2000.
Elliot, et al. "Liquid Fuels by Low-Severity Hydrotreating of Biocrude", Developments in Thermochemical Biomass Conversion, vol. 1, pp. 611-621, A. V. Bridswater and D.G.B. Boocock, eds., Blackie Academic & Professional, 1996, London, 11 pages.
Environmental Protection Agency, "National Emmissions Inventory (NEI) Air Pollutant Emissions Trends Data", Technology Transfer Network, Clearinghouse for Emissions Inventories and Emissions Factors, Jun. 2012, 2 pages.
Fukuda et al."The Effect of Fuel Aromatic Structure and Content on Direct Injection Diesel Engine Particulates", Society of Automotive Engineers, [Progress in Technology] PT; PT-11 (alternative Disel Fuels), 2004, 259-270.
Garcia-Perez, et al. "Production and Fuel Properites of Fast Pyrolysis Oil-Bio-Diesel Blends" Fuel Processing Technology 91 (2010) 296-305.
Gerdes et al."Alternatives From Wood and Cellulose, Precoat Filtration With Organic Filter Aids", J. Rettenmaier Benelux, Filtration & Separation, vol. 34, No. 10, ISSN 0015-1882, Dec. 6, 1997, 6 pages.
Graboski et all., "The Effect of Biodiesel Composition on Engine Emissions From a DDC Series 60 Diesel Engine", Final Report, Report 2 in a Series of 6, Colorado Institue for Fuels and Engine Research , National Renewable Energy Laboratory, Technical Report, NREL.SR-510-31461, Feb. 2003.
Han et al., "Selecting Pour Depressants for Diesel Fuels", Chemistry and Technology of Fuels and Oils, Springer Science & Business Media, Inc., vol. 46, No. 5, 2010.
Hilten, et al. "Comparison of Three Accelerated Aging Procedures to Assess Bio-Oil Stability" Fuel 89 (2010), 2741-2749.
Huber et al., "Production of Liquid Alkanes by Aqueous-Phase Processing of Biomass-Derived Carbohydrates", ScienceMag.Org, vol. 308, Jun. 2005.
Ikura, et al. "Emulsification of Pyrolysis Derived Bio-Oil in Diesel Fuel," Biomass & Bio Energy 24 (2003) 212-232.
IP Hydrocarbon Management, "HM 40 Guidelines for the Crude Oil Washing of Ships' Tanks and Heating of Crude Oil Being Transported by Sea", Energy Institute, London 2nd Edition, Jun. 2004.
Lehto et al., Fuel Oil Quality and Combustion of Fast Pyrolysis Bio-Oils, Espoo 2013, VTT Technology 87, 84 pages.
Liesenring, "Standard Specification for Diesel Fuel Oils", Designation: D975-11, ASTM International, Jan. 2012.

Mahinpey, et al. "Analysis of Bio-Oil, Biogas, and Biochar From Pressurized Pyrolysis of Wheat Straw Using a Tubular Reactor" Energy & Fuels 2009,23 2736-2742.
Mathpro, "An Introduction to Petroleum Refinin and the Production of Ultra Low Silgur Casline and Diesel Fuel", Prepared for International on Clean Transportation (icct), Energy Economics Applied Optimization, MathPro, Oct. 2011.
Moens, et al. "Study of the Neutralization and Stabilization of a Mixed Hardwood Bio-Oil" Energy & Fuels 2009, 23, 2695-2699.
Mohan, D., et al., Energy & Fuels, 20, 848-889 (2006).
Mrad, et al."Effects of Biofuel From Fish Oil Industrial Residue—Diesel Blends in Diesel Engine", Energy, Elsevier Ltd., 44, 2012.
Oasmaa, et al. "Fast Pyrolysis of Forestry Residue 3 Storage Stability of Liquid Fuel" Energy & Fuels 2003, 17, 1075-1084.
Ozcimen et al., "Production and Characterization of Bio-Oil and Biochard From Rapeseed Cake", Department of Chemical Engineering, Istanbul Technical Univeristy, Turkey, Jan. 2003, Renewable Energy, 29, 2004, 779-787.
Pollard, A.J.S., (2009) Comparision of Bio-oil Produced in a Fractioned Bio-Oil Collection System, Masters Thesis, Iowa State University, 173 pages.
Qi, et al. "Review of Biomass Pyrolysis Oil Properties and Upgrading Research", Energy Conversion & Management 48 (2008) 87-92.
Ringer, et al. "Large-Scale Pyrolysis Oil Production: A Technology Assessment and Economic Analysis" NREL Technical Report, NREL/TP-210-37779, Nov. 2006.
Sanchez, et al., "Properties of Gasoline and Diesel Fuels Continung Renewable Drop-In Bio Fuel Blend Stocks Prepared by the Thermos-Catalytic Conversation of Lignocellulose", KiOR, Inc. and PetroTech Consultants LLC.
Sinnott, R.K., Chemical Engineering Design, 4th ed., Elsevier, 1038 pages, (2005).
Song, et al., "Effective Phase Separation of Biomass Pyrolysis Oils by Adding Aqueous Salt Solutions", Energy & Fuels, vol. 23, 2009, pp. 3307-3312.
Trewella et al., "Renewable Fuel Co-Products—Potential Uses in Asphalt", PetroTech Consultants, LLC, 2012.
U.S. Dept. of Energy, Technical Information Exchange on Pyrolysis Oil: Potential for a Renewable Heating Oil Substitution Fuel in New England, Work Shopt Report: Pyrolysis Oil Technical Information Exchange Workshop Summary Report, May 9-10, 2012, Manchester, NH, Energetics Incorporated, Columbia, MD, Bioenergy Technologies Office, Washington, DC, 59 pages.
World Minerals, "Maximize Biodiesel Yields by Using Celite ® Filter Aids, Filtrations, Dewatering, Dewaxing and Winterizing." Biodiesel, World Minerals Americas and World Headquarters, World Minerals Inc., Santa Barbara, California, USA, 2009, 4 pages.
PCT/US2011/055355—WO/2012/057986, International Search Report and Written Opinion, dated Feb. 24, 2012.
PCT/US2011/055355—WO/2012/057986, International Preliminary Report on Patentability, dated Apr. 30, 2013.
PCT/US2011/055411, International Search Report and Written Opinion, dated Mar. 12, 2012.
PCT/US2012/022945, Search Report and Written Opinion, dated Sep. 25, 2012.
PCT/US2012/022951—WO/2012/109035, International Search Report and Written Opinion, dated Sep. 26, 2012.
PCT/US2012/050561—WO/2013/025600, International Preliminary Report on Patentability, dated Feb. 18, 2014.
PCT/US2012/050561—WO/2013/025600, International Search Report and Written Opinion, dated Jan. 2, 2013.
PCT/US2014/035804—WO/2014/182499, International Search Report and Written Opinion, dated Aug. 19, 2014.
PCT/US2015/010056, Search Report and Written Opinion, dated Apr. 29, 2015.
CN101144025A, Chinese Office Action including Search Report, dated Feb. 28, 2015.
Extended European Search Report for PCT/US2014048648, dated Jun. 14, 2017.
Canadian Office Action, dated Jun. 30, 2017, for PCT Application No. US2011055411.
EPO Office Action for European Application No. 14794254.4, dated May 9, 2019.

(56) References Cited

OTHER PUBLICATIONS

Anja Oasmaa et al.: "Fast Pyrolysis Bio-Oils from Wood and Agricultural Residues", Energy & Fuels, vol. 24, No. 2, Feb. 18, 2010, pp. 1380-1388.

Ljudmila Fele Ilnik et al.: "Recovery of Renewable Phenolic Fraction from Pyrolysis Oil", Separation and Purification Technology, Elsevier Science, Amsterdam, NL, vol. 86, Oct. 29, 2011, pp. 157-170.

* cited by examiner

PROCESS FOR UPGRADING BIOMASS DERIVED PRODUCTS USING LIQUID-LIQUID EXTRACTION

CROSS-REFERENCE TO RELATED APPLICATIONS/INCORPORATION BY REFERENCE STATEMENT

The present application is a continuation-in-part of U.S. Ser. No. 13/889,105, filed May 7, 2013; which is a continuation-in-part of U.S. Ser. No. 13/212,861, filed Aug. 18, 2011, and issued on Apr. 19, 2016 as U.S. Pat. No. 9,315,739; the entire contents of each of which is hereby expressly incorporated herein by reference.

BACKGROUND

1. Field

The present disclosure relates generally to the alteration of the ratio of the specific gravities of the oil and water phases resulting from the conversion of biomass to liquid products, which can further include the removal of metals and/or the modification of the conductivity, and more particularly to an effective means to reduce the level of solids contained in the oil phase. The presently disclosed and/or claimed invention also relates to using liquid-liquid extraction to partition desirable carbon containing compounds into the oil phase and undesirable carbon containing compounds into the water phase.

2. Description of the Related Art

In the conversion of biomass to liquid products, the product stream can contain both an oil phase and a water phase (containing both water present in the biomass prior to conversion, and water produced during the conversion process). Pyrolysis, in particular flash pyrolysis, has been proposed as one such process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It is often the case that the oil phase has a higher specific gravity than the water phase, resulting in the oil phase settling to the bottom of a settling vessel, and emulsions can also form between the oil and water phases. As a result, any solids present in the reaction products also settle into the oil phase, which can cause issues in downstream processing of the oil, and can be difficult and expensive to remove.

Thus, there is a need for an improved system whereby the solids content of biomass derived oil is reduced.

In addition, undesirable carbon containing compounds such as aldehydes and carboxylic acids can be present in the liquid product and such are not easily upgradable to transportation fuels. Such undesirable carbon containing compounds can be present in the oil phase while desirable carbon containing compounds can be present in the water phase, thus lowering the yield of high quality bio-oil for upgrading to fuels. Thus, there is also a need for an improved system whereby undesirable carbon containing compounds are transferred from the oil phase to the water phase and desirable carbon containing compounds are transferred from the water phase to the oil phase.

BRIEF SUMMARY

In accordance with an embodiment of the present disclosure, a process is provided comprising:

a) providing a first mixture including a first oil phase comprising biomass derived carbon containing compounds and a first aqueous phase comprising water; wherein the ratio of the specific gravities of the first oil phase to the first aqueous phase (SGR1) is greater than 1.0;

b) modifying the specific gravity of at least one of the first oil phase and the first aqueous phase, thereby resulting in a second mixture having a second oil phase and a second aqueous phase, wherein the ratio of the specific gravities of the second oil phase to the second aqueous phase (SGR2) is less than 1.0; and c) separating the second oil phase from the second aqueous phase.

In accordance with another embodiment of the present disclosure, such process can additionally comprise:
combining at least one specific gravity modifier comprising a diluent with the first oil phase, thereby forming the second oil phase, and wherein the specific gravity of the second oil phase is lower than the specific gravity of the first oil phase.

In accordance with another embodiment of the present disclosure, such process can additionally comprise:
combining at least one specific gravity modifier comprising a water-soluble compound with the first aqueous phase, thereby forming the second aqueous phase, and wherein the specific gravity of the second aqueous phase is higher than the specific gravity of the first aqueous phase.

In accordance with another embodiment of the present disclosure, such process can additionally comprise:
combining at least one specific gravity modifier comprising a water soluble co-solvent with the first aqueous phase, thereby forming the second aqueous phase, and wherein the specific gravity of the second aqueous phase is higher than the specific gravity of the first aqueous phase.

In accordance with another embodiment of the present disclosure, such process can additionally comprise:
combining at least one specific gravity modifier comprising a diluent, a water-soluble compound, a water soluble co-solvent, and combinations thereof, with the first mixture, thereby forming the second oil phase and the second aqueous phase.

In accordance with another embodiment of the present disclosure, such process can additionally comprise:
allowing the second mixture to settle, thereby forming an upper layer containing the second oil phase and a lower layer containing the second aqueous phase, wherein the first oil phase contains solids, and following the settling, the second oil phase in the upper layer contains less solids than the first oil phase.

In accordance with another embodiment of the present dislcosure, such process can additionally comprise:
adding a quantity of a conductivity modifier to the first mixture thereby forming the second mixture, wherein the conductivity modifier can have a TAN lower than the TAN of the first mixture, and wherein the quantity of conductivity modifier is sufficient such that the electrical conductivity of the second mixture is lower than the electrical conductivity of the first mixture.

In accordance with another embodiment of the present disclosure, wherein the first and/or second oil phases further contain metals, a process is provided comprising:
contacting the first and/or second mixtures with specific acids for removal of at least a portion of the metals from either or both of the first and second oil phases.

In accordance with another embodiment of the present disclosure, a method is provided comprising:
a) contacting an extraction solvent with a first mixture comprising water and biomass derived carbon containing compounds including organics A comprising compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising compounds having at least four carbon atoms per molecule, thereby forming a second mixture comprising an extract and a raffinate, wherein the organics B are substantially free of: i) aldehydes, ii) ketones having from 3 to 4 carbon atoms per molecule, and iii) carboxylic acids having from 2 to 3 carbon atoms per molecule, wherein the extract and the raffinate are immiscible, the extract comprises substantially all of the extraction solvent and substantially all of the organics B, the raffinate comprises substantially all of the water and substantially all of the organics A, and wherein the extraction solvent has a dipole moment greater than about 1.0 debye, a density less than about 1.0, a water solubility at 20° C. of less than about 2.5 g/100 ml of water, and a boiling point in the range of from about 90 to about 300° F.;
b) separating the second mixture thereby forming an intermediate product stream comprising at least a portion of the extract and a waste water stream comprising substantially all of the raffinate; and
c) removing at least a portion of the extraction solvent from the intermediate product stream forming a recovered extraction solvent and a bio-oil product.

In accordance with another embodiment of the present disclosure, a method is provided comprising:
a) providing a first mixture comprising water and biomass derived carbon containing compounds including organics A comprising carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising carbon containing compounds having at least four carbon atoms per molecule, wherein organics B are substantially free of the organics A, and wherein the first mixture includes i) a first oil phase comprising at least a portion of the biomass derived carbon containing compounds and at least a portion of the water and ii) a first aqueous phase comprising at least a portion of the water and at least a portion of the biomass derived carbon containing compounds, wherein the first oil phase and the first aqueous phase are immiscible;
b) contacting the first mixture with an extraction solvent thereby forming a second mixture comprising a second oil phase and a second aqueous phase; wherein substantially all of the organics A present in the first oil phase are partitioned from the first oil phase to the first aqueous phase and substantially all of the organics B present in the first aqueous phase are partitioned from the first aqueous phase to the first oil phase, thereby forming the second oil phase comprising substantially all of the organics B and substantially all of the extraction solvent and the second aqueous phase comprising substantially all of the water and substantially all of the organics A, wherein the second oil phase and the second aqueous phase are immiscible, and wherein the extraction solvent has a dipole moment greater than about 1.0 debye, a density less than about 1.0, a water solubility at 20° C. of less than about 2.5 g/100 ml of water, and a boiling point in the range of from about 90 to about 300° F.; and
c) separating the second mixture thereby forming an intermediate product stream comprising at least a portion of the second oil phase and a waste water stream comprising substantially all of the second aqueous phase.

DETAILED DESCRIPTION

The biomass material useful in the presently disclosed and/or claimed invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be converted, by any suitable means, to reaction products comprising, at least in part, a first mixture comprising, consisting of, or consisting essentially of water and biomass derived carbon containing compounds which can include organics A comprising carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof, and organics B comprising carbon containing compounds having at least four carbon atoms per molecule. The carbon containing compounds of the organics B can be selected from the group consisting of ketones, furans, phenols, catechols, aromatics hydrocarbons (such as, but not limited to, alkyl benzenes and naphthalenes), indenols, indanols, naphthalenos, benzofurans, and combinations thereof. The first mixture can also comprise i) a first oil phase (also referred to as bio-oil) comprising, consisting of, or consisting essentially of at least a portion of the biomass derived carbon containing compounds and at least a portion of the water and ii) a first aqueous phase (also referred to as process water) comprising, consisting of, or consisting essentially of at least a portion of the water and at least a portion of the biomass derived carbon containing compounds. The first oil phase (or bio-oil) of the reaction products can comprise at least about 6, or at least about 7, or at least about 8 wt % water. The first oil phase and the first aqueous phase can be immiscible. The biomass conversion can be by a method including, but not limited to, fast pyrolysis, catalytic pyrolysis, and hydrothermal conversion, each at elevated temperatures. The temperatures can range from 300 to 1000 C, or 400 to 700 C. The first mixture can have a Total Acid Number (TAN) of at least about 2, or at least about 3, or at least about 10, or at least about 20, or at least about 30.

The biomass feed can be charged to a reaction zone along with a heat carrier material and/or a catalyst for mixture with the biomass feed and to transfer heat thereto. Useful catalysts for this process include those containing catalytic acidity and preferably containing zeolite. The biomass feed can be converted to reaction products comprising, consisting of, or consisting essentially of: the first mixture described above, and optionally light gases and/or char. The reaction products can be removed from the reaction zone and the first mixture condensed therefrom. The first mixture can also comprise, consist of or consist essentially of a first oil phase comprising, consisting of, or consisting essentially of biomass derived carbon containing compounds, and a first aqueous phase comprising, consisting of, or consisting essentially of water, and solids. The solids can include dissolved or suspended solids and can be catalyst fines, char, unreacted biomass and ash. The first oil phase can comprise at least a portion of the biomass derived carbon containing compounds and at least a portion of the water. The first aqueous phase can comprise at least a portion of the water and at least a portion of the biomass derived carbon containing compounds and at least a portion of the solids.

Specific Gravity Modification

The ratio of the specific gravities of the first oil phase to the first aqueous phase (SGR1) can be greater than 1.0, greater than about 1.05, or greater than about 1.1. The specific gravity of at least one of the first oil phase and the first aqueous phase can be modified, thereby resulting in a second mixture having a second oil phase and a second aqueous phase, wherein the ratio of the specific gravities of the second oil phase to the second aqueous phase (SGR2) is less than 1.0, preferably less than about 0.99, and more preferably less than about 0.97.

The modification of the specific gravity of at least one of the first oil phase and the first aqueous phase can include adding at least one specific gravity modifier to the mixture, thereby forming the second mixture.

A diluent can be combined with the first oil phase, as at least a portion of the specific gravity modifier, thereby forming the second oil phase, resulting in the specific gravity of the second oil phase being lower than the specific gravity of the first oil phase. More particularly, the specific gravity of the second oil phase is less than 1.0. The diluent preferably has a specific gravity less than about 0.97. The diluent can be selected from the group consisting of: light cycle oil, naphtha, toluene, methyl isobutyl ketone, reformate, a bio-oil fraction having a specific gravity lower than the specific gravity of the first oil phase, a hydrotreated bio-oil fraction having a specific gravity lower than the specific gravity of the first oil phase, and combinations thereof.

The bio-oil fraction can be obtained as a fraction of the first oil phase following the specific gravity modification step. The hydrotreated bio-oil fraction can optionally be obtained as a fraction of the first oil phase following hydrotreatment of the first oil phase.

The ratio by volume of the diluent to the first oil phase can be in the range of from about 0.6:1 to about 6:1, or from about 0.6:1 to about 4:1, or from about 0.6:1 to about 2.4:1, or from about 0.6:1 to about 1:1. When light cycle oil is used as the diluent, the ratio by volume of the diluent to first oil phase can be in the range of from about 0.05:1 to about 1:1, or from about 0.05:1 to about 0.2:1.

The modification of the specific gravity of at least one of the first oil phase and the first aqueous phase can also include combining a water-soluble compound, as at least a portion of the specific gravity modifier (alone or in addition to the use of a diluent as a specific gravity modifier), with the first aqueous phase, thereby forming the second aqueous phase, and wherein the specific gravity of the second aqueous phase is higher than the specific gravity of the first aqueous phase. Preferably, the specific gravity of the second aqueous phase ends up being greater than about 1.05. The water-soluble compound can be selected from the group consisting of NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, and combinations thereof.

The water-soluble compound can be added as a solid and dissolved into the first aqueous phase, and can also, alternatively, be added in the form of a water-soluble compound solution. The water-soluble compound is preferably ammonium bicarbonate, NaCl, or $MgCl_2$. The water-soluble compound is preferably combined with the first aqueous phase in a quantity sufficient to result in a specific gravity of the second aqueous phase which is greater than about 1.05.

The modification of the specific gravity of at least one of the first oil phase and the first aqueous phase can also include combining a water-soluble co-solvent, as at least a portion of the specific gravity modifier (alone or in addition to the use of one or both of the diluent or water-soluble compound as specific gravity modifiers), with the first aqueous phase, thereby forming the second aqueous phase, and wherein the specific gravity of the second aqueous phase is higher than the specific gravity of the first aqueous phase. The water soluble co-solvent can be a glycol, and more preferably, is selected from the group consisting of ethylene glycol, polyethylene glycol, propylene glycol, polypropylene glycol, and combinations thereof. The resulting specific gravity of the second aqueous phase is preferably greater than about 1.05.

More generally, the at least one specific gravity modifier added to the first mixture can also be selected from the group consisting of a light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, a glycol, and combinations thereof.

The second mixture is preferably allowed to settle in a settling vessel, thereby forming an upper layer containing the second oil phase and a lower layer containing the second aqueous phase. The first oil phase can contain solids, which can be present in an amount of at least about 100, or about 1000, or about 3,000 ppmw. The solids can include, but are not limited to, organic and inorganic components, which can include solid catalyst material. Following the settling of the second mixture, the second oil phase in the upper layer contains less solids than the first oil phase; and can contain less than about 25, or about 10, or about 5 wt % of the solids contained in the first oil phase; and preferably contains less than about 80 ppmw solids.

When a diluent is used as at least one specific gravity modifier, at least a portion of the second oil phase in the upper layer can be passed to a separator for recovery of at least a portion of the diluent, resulting in a recovered diluent. At least a portion of the recovered diluent can be recycled for use as at least a portion of the diluent.

Additionally, when a diluent is used as at least one specific gravity modifier, at least a portion of the second oil phase can be passed to a separator for recovery of at least one bio-oil fraction from the second oil phase. At least one of the bio-oil fractions can be utilized, as at least a portion of the diluent.

Further, when a diluent is used as at least one specific gravity modifier, at least a portion of the second oil phase can be passed to a hydrotreater for at least partial hydrotreating, thereby forming a hydrotreated stream, and at least a portion of the hydrotreated stream can be passed to a separator for separation into at least one hydrotreated bio-oil fraction. At least one of the hydrotreated bio-oil fractions can be utilized as at least a portion of the diluent.

Conductivity Modification

Alternatively, a quantity of a conductivity modifier can also be added to the first mixture thereby forming the second mixture, wherein the quantity of the conductivity modifier is sufficient such that the electrical conductivity of the second mixture is lower than the electrical conductivity of the first mixture. The first mixture can have an electrical conductivity of at least about 900,000, or at least about 950,000 nano Siemens per meter (nS/m); and the second mixture preferably has an electrical conductivity less than about 800,000 or less than about 500,000 nS/m. In one embodiment, the conductivity modifier can have a TAN lower than the TAN of the first mixture, and preferably has a TAN at least about 2 units lower than the TAN of the first mixture. The electrical conductivity of the second mixture is preferably less than about 75%, more preferably less than about 50%, and even more preferably less than about 25% of the electrical conductivity of the first mixture.

The conductivity modifier can be selected from the group consisting of an aqueous solution, a fraction separated from the biomass derived carbon containing compounds, a fraction separated from the biomass derived carbon containing compounds following hydrotreatment of the biomass derived carbon containing compounds, and combinations thereof. The conductivity modifier can comprise an aqueous solution having a pH greater than 7 or greater than about 9. The aqueous solution can comprise a base selected from the group consisting of NaOH, KOH, NH$_4$OH, alkyl amines, pyridines, quinolines, ammonia, ammonium compounds including: nitrates, sulfides, carbonates, hydroxides, acetates, chlorides, bromides, iodides, and sulfates, and combinations thereof, and is preferably ammonium bicarbonate or ammonium hydroxide or a combination thereof. Combinations of bases can be added separately or simultaneously as a pre-mixed solution. If added separately, they can be added at different process conditions including different temperature and different pressures. Buffers may also be used to more tightly control pH.

In addition, at least a portion of the first mixture and/or the resulting second mixture can be in the form of an emulsion comprising a portion of the biomass derived carbon containing compounds and a portion of the water. The second mixture, including the conductivity modifier described above, can be subjected to electrostatic dehydration, resulting in at least a partial breaking of the emulsion, and freeing from the emulsion at least 75%, or at least 90%, or at least 95% of the biomass derived carbon containing compounds contained in the emulsion or at least 50%, or at least 70%, or at least 95% of the water contained in the emulsion. Also, the second mixture, following electrostatic dehydration, preferably has an electrical conductivity less than about 250,000 nS/m. The electrostatic dehydration is preferably performed in a desalter vessel. Also, a demulsifier compound can be added to the first mixture, along with the conductivity modifier, thereby forming the second mixture which is then subjected to the electrostatic dehydration. The demulsifier can be an alkoxylate derived from a poly amine.

Acid Treatment

In addition, the first and second oil phases can each further comprise metals, which can be selected from the group consisting of Al, Ca, Mg, Si, Fe, and combinations thereof. At least a portion of these metals can be removed from either the first oil phase or the second oil phase, or both, into either the first or second aqueous phases by contact of either or both of the first mixture and the second mixture with certain acids. If metals are removed from the first oil phase into the first aqueous phase by contact with such acid(s), the conductivity modifier can then optionally be added to form the second mixture, having a reduced electrical conductivity, as described above. The removal of at least a portion of the metals can also take place from the second oil phase into the second aqueous phase following addition of the conductivity modifier, and also optionally, before or after the electrostatic dehydration of the second mixture to at least partially break the emulsion, as described above.

The acid can be selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, alpha-hydroxy carboxylic acids, and their salts, and combinations thereof. The acid also preferably has a pH less than about 5.

The acid and metal interaction can include, but is not limited to, a process selected from the group consisting of: chemically binding at least a portion of the metals; removing at least a portion of the metals from the first and or second oil phases; or combinations thereof.

Liquid-Liquid Extraction

Alternatively, the first mixture can be contacted with an extraction solvent thereby forming a second mixture comprising an extract and a raffinate, wherein the extract and raffinate are immiscible. The organics B described above can be substantially free of i) aldehydes, ii) ketones having from 3 to 4 carbon atoms per molecule, and iii) carboxylic acids having from 2 to 3 carbon atoms per molecule. The term "substantially free" as used herein means less than 5, or 3, or 2, or 1, or 0.5, or 0.1 wt %. The extract can comprise substantially all of the extraction solvent and substantially all of the organics B, and the raffinate can comprise substantially all of the water and substantially all of the organics A. The term "substantially all" as used herein means at least 85, or 90, or 95, or 98, or 100 wt %. The extraction solvent can have a dipole moment greater than about 1.0 or greater than about 2.0 or greater than about 4.0 debye; a density less than about 1.0 or less than about 0.9 or less than about 0.8; a water solubility at 20° C. of less than about 2.5 or less than about 2.2 or less than about 2.0 g/100 ml of water; and a boiling point in the range of from about 90 to about 300° F. or from about 200 to about 270° F. or from about 200 to about 260° F. The extraction solvent can be substantially unreactive when exposed to acidic aqueous media and substantially thermally stable at temperatures up to about 500° F. Also, the extraction solvent can comprise a member selected from the group consisting of methyl isobutyl ketone, cyclopentyl-methyl-ether, and combinations thereof.

The second mixture can then be separated thereby forming an intermediate product stream comprising at least a portion of, or substantially all of, the extract and a waste water stream comprising substantially all of the raffinate. At least a portion of the extraction solvent can be removed from the intermediate product stream forming a recovered extraction solvent and a bio-oil product, and the recovered extraction solvent can be recycled as at least a part of the extraction solvent contacted with the first mixture, as described above.

The viscosity of the second mixture is lower than the viscosity of the first mixture making it easier to filter. The second mixture can be filtered to remove at least a portion of the solids therefrom prior to the separation of the second mixture. In addition, the partition coefficients of the organics A for the extract and the raffinate can each be less than about 1.0 or less than about 0.7, and the partition coefficients of the organics B for the extract and the raffinate can each be greater than about 1.0 or greater than about 2.0.

The bio-oil product can comprise less than about 10, or less than about 7, or less than about 5, or less than about 4, or less than about 3, or less than about 2, or less than about 1.0 or less than about 0.8 or less than about 0.5 wt % of the organics A, and can comprise less than about 5, or less than about 3, or less than about 2, or less than about 1 or less than about 0.5 wt % water. Having a lower water content in the bio-oil product aids in any subsequent hydrodeoxygenation by both allowing increased volume throughput in the unit and increased hydrodeoxygenation activity due to an equilibrium shift (given that water is a product of hydrodeoxygenation). The waste water stream separated from the second mixture can comprise less than about 0.5, or less than about 0.4, or less than about 0.3, or less than about 0.2, or less than about 0.1 or less than about 0.05 wt % of the organics B.

The first aqueous phase (process water) can be separated from the reaction products described above to form the first mixture, or the reaction products can be used as the first mixture. The first mixture can be counter-currently or cross-currently contacted with the extraction solvent. Also, the contacting of the first mixture with the extraction solvent can be in a manner such that the second mixture is formed as a static mixture, with separation of the second mixture by decanting.

In accordance with another embodiment, the first mixture can be contacted with the extraction solvent thereby forming an extraction mixture comprising an extraction oil phase and an extraction aqueous phase. Substantially all of the organics A present in the first oil phase can be partitioned from the first oil phase to the first aqueous phase and substantially all of the organics B present in the first aqueous phase can be partitioned from the first aqueous phase to the first oil phase, thereby forming the extraction oil phase comprising, consisting of, or consisting essentially of substantially all of the organics B and substantially all of the extraction solvent and the extraction aqueous phase comprising, consisting of, or consisting essentially of substantially all of the water and substantially all of the organics A. The extraction oil phase and the extraction aqueous phase can be immiscible. The extraction mixture can be separated thereby forming an intermediate product stream described above comprising at least a portion of, or substantially all of, the extraction oil phase and a waste water stream comprising substantially all of the extraction aqueous phase. At least a portion of the extraction solvent can be removed from the intermediate product stream forming a recovered extraction solvent and a bio-oil product, and the recovered extraction solvent can be recycled as at least a part of the extraction solvent contacted with the first mixture, as described above.

The viscosity of the extraction mixture is lower than the viscosity of the first mixture making it easier to filter. The extraction mixture can further comprise solids and can be filtered to remove at least a portion of such solids therefrom prior to the separation of the extraction mixture. In addition, the partition coefficients of the organics A for the extraction oil phase and the extraction aqueous phase can each be less than about 1.0 or less than about 0.7, and the partition coefficients of the organics B for the extraction oil phase and the extraction aqueous phase can each be greater than about 1.0 or greater than about 2.0.

The bio-oil product can comprise less than about 10, or less than about 7, or less than about 5, or less than about 4, or less than about 3, or less than about 2, or less than about 1.0 or less than about 0.8 or less than about 0.5 wt % of the organics A, and can comprise less than about 5, or less than about 4, or less than about 3, or less than about 2, or less than about 1, or less than about 0.5 wt % water. Having a lower water content in the bio-oil product aids in any subsequent hydrodeoxygenation by both allowing increased volume throughput in the unit and increased hydrodeoxygenation activity due to an equilibrium shift (given that water is a product of hydrodeoxygenation). The waste water stream separated from the extraction mixture can comprise less than about 0.5, or less than about 0.4, or less than about 0.3, or less than about 0.2, or less than about 0.1 or less than about 0.05 wt % of the organics B.

The first aqueous phase (process water) can be separated from the reaction products described above to form the first mixture, or the reaction products can be used as the first mixture. The first mixture can be counter-currently or cross-currently contacted with the extraction solvent. Also, the contacting of the first mixture with the extraction solvent can be in a manner such that the second mixture is formed as a static mixture, with separation of the second mixture by decanting.

Methyl Isobutyl Ketone Extraction Process for Recovering Bio-Oil Product

In another aspect, the present disclosure is directed to a method comprising: (a) providing a first mixture comprising reaction products produced from catalytic conversion of biomass (as described above), wherein said reaction products comprise water and biomass derived carbon containing compounds; (b) contacting said first mixture with an extraction solvent comprising, consisting of, or consisting essentially of methyl isobutyl ketone, thereby forming an extraction mixture comprising an extraction oil phase and an extraction aqueous phase; wherein the extraction oil phase has a specific gravity less than 1.0 and the extraction aqueous phase has a specific gravity equal to or greater than 1.0; and (c) separating the extraction oil phase and the extraction aqueous phase.

The biomass conversion can comprise, for example but without limitation, fast pyrolysis, catalytic pyrolysis, and/or hydrothermal conversion, each at elevated temperatures. The temperatures can range from 300 to 1000° C., or 400 to 700° C. The first mixture can have a Total Acid Number (TAN) of at least about 2, or at least about 3, or at least about 10, or at least about 20, or at least about 30.

In one embodiment, the biomass conversion can be by catalytic pyrolysis at a temperature ranging from 400° C. to 700° C.

In one embodiment, the extraction mixture further comprises solids and at least a portion of the solids are removed from the extraction mixture by filtration prior to step b). In another embodiment, at least one of the extraction oil phase and the extraction aqueous phase comprises solids and at least a portion of the solids are removed from at least one of the extraction oil phase and the extraction aqueous phase by filtration after step c).

Separating the extraction oil phase and extraction aqueous phase can comprise feeding the extraction mixture to, for example but without limitation, a decanter, filter, filter press, centrifuge, decanter centrifuge, an inverting filter centrifuge, and combinations thereof.

In one embodiment, the method further comprises separating at least a portion of the extraction solvent from the extraction oil phase to produce a bio-oil product substantially free of the extraction solvent. In one embodiment, the step of separating at least a portion of the extraction solvent from the extraction oil phase comprises feeding the extraction oil phase to an extraction solvent recovery system comprising one or more distillation columns In one embodiment, at least a portion of the separated extraction solvent is recycled as at least a part of the extraction solvent in step b).

The following examples are provided to further illustrate the presently disclosed and/or claimed inventive concept(s) and are not to be considered as unduly limiting the scope of the presently disclosed and/or claimed inventive concept(s).

EXAMPLES

Example I

A product mixture produced from the thermo-catalytic pyrolysis of southern yellow pine wood chips was collected and allowed to settle. The organic phase (raw bio-oil) for the product mixture settled to a position below the water phase. A 45 ml. quantity of the raw bio-oil, separated from the product mixture, was mixed with a 45 ml. quantity of an un-hydrotreated bio-naphtha fraction of the bio-oil (bio-naphtha). A 10 ml. quantity of process water separated from the product mixture was also added to the raw bio-oil and bio-naphtha. A total of twenty four (24) 100 ml. samples were prepared in this way. The resulting samples were each mixed for around 20 seconds and placed in a 140 F water bath for around 1 hour. Upon settling, the organic phase (blended bio-oil) layer for each sample was flipped and on top, with the water phase on the bottom of the containers. The blended bio-oil for each sample was then extracted and all extracted blended bio-oils combined in one container. The container was then mixed for around 20 seconds and an aliquot was tested for filterable solids through a 0.2 μm PVDF membrane filter. A sample of the raw bio-oil separated from the product mixture was also tested for filterable solids through a 0.2 μm PVDF membrane filter. The amount of solids in the blended (flipped) bio-oil was about 610 ppm (with 1220 ppm attributed to the raw bio-oil portion), compared to about 3,558 ppm for the un-flipped raw bio-oil.

As can be seen from the data above, the solids content in the bio-oil drops significantly once the oil and water layers are flipped. This provides substantial benefits for downstream processing of the bio-oil, such as hydrotreatment, and significantly reduces the cost of any subsequently required solids removal.

Example II

A product mixture produced from the thermo-catalytic pyrolysis of southern yellow pine wood chips was collected and allowed to settle. The organic phase (raw bio-oil) for the product mixture settled to a position below the water phase. A 100 ml. quantity of the raw bio-oil, separated from the product mixture, was mixed with a 100 ml. quantity of an un-hydrotreated bio-naphtha fraction of the raw bio-oil. The 200 ml. bio-oil/bio-naphtha mixture was split into four samples. Each of the four samples was combined with 50 ml. quantities of process water separated from the product mixture. Three different demulsifier additives were added to three of the samples. The four samples were each mixed for around 20 seconds and placed in a 140 F water bath for around 30 minutes. The organic phase (blended bio-oil) layer for each sample was flipped and on top, with the water phase on the bottom of the containers. The blended bio-oil for each sample was then extracted. Each of the four extracted blended bio-oils were mixed for around 20 seconds, and aliquots of each were tested for filterable solids through a 0.2 μm PVDF membrane filter. The amount of solids contained in the three blended (flipped) bio-oil samples including desalter additives were about 205, 193, and 400 ppm; and the amount of solids contained in the blended (flipped) bio-oil sample not including a desalter additive was about 492 ppm. The desalter additives used were from Champion Technologies and designated as XZ-1677, Code 80 and EC-1-C, respectively.

Example III

A product mixture produced from the thermo-catalytic pyrolysis of southern yellow pine wood chips was collected and allowed to settle. The organic phase (raw bio-oil) for the product mixture settled to a position below the water phase. A quantity of the total product mixture was mixed with a quantity of a Light Cycle Oil (LCO) obtained from a crude oil refinery. The product mixture/LCO mixture was vigorously mixed for around 30 seconds. The product mixture/LCO mixture was then centrifuged to separate out the blended bio-oil. The blended bio-oil, as well as a sample of the raw bio-oil from the product mixture, were then tested for ash content. The ash content of the blended bio-oil was only about 0.007 wt %, compared to about 0.146 wt % for the control raw bio-oil.

As can be seen from the data above, the ash content in the bio-oil drops significantly once the oil and water layers are flipped.

Example IV

A product mixture produced from the thermo-catalytic pyrolysis of southern yellow pine wood chips was collected and allowed to settle. The organic phase (raw bio-oil, pH of about 4.5) for the product mixture settled to a position below the product water phase (pH of about 4-5). Three separate quantities of the total product mixture were mixed with quantities of LCO sufficient such that the resulting organic phases of the mixtures contained about 5 wt %, about 10 wt %, and about 20 wt % LCO, respectively. The density of the product water portions of the three mixtures were also modified by adding NaCl such that the resulting product water for each mixture contained about 2 M NaCl. For each of the mixtures, the organic phase (blended bio-oil) layer was flipped and on top, with the 2 M NaCl product water phase on the bottom of the container. The density of the bio-oil vs. percent of LCO added is shown in Table 1 below.

TABLE 1

| | % LCO in blended bio-oil | | | |
| --- | --- | --- | --- | --- |
| | 0 | 5 | 10 | 20 |
| Blended bio-oil Density (g/ml) | 1.10 | 1.08 | 1.07 | 1.05 |

Example V

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). NaCl was added to five of the bio-oil/water mixtures such that the distilled water portions separately contained about 1 M NaCl, about 2 M NaCl, about 3 M NaCl, about 4 M NaCl, and about 5 M NaCl, respectively. For each of the 3 M, 4 M, and 5 M NaCl mixtures, the organic phase (blended bio-oil) layer was clearly flipped and on top, with the water phase on the bottom of the container. For the 2 M NaCl mixture, the layers were mostly, but not completely, flipped, and the layers were not flipped for the 1 M NaCl mixture.

Example VI

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). $MgCl_2$ was added to five of the bio-oil/water mixtures such that the distilled water portions separately contained about 1M $MgCl_2$, about 2 M $MgCl_2$, about 3 M $MgCl_2$, about 4 M $MgCl_2$, and about 5 M $MgCl_2$, respectively. For each of the 3 M, 4 M, and 5 M $MgCl_2$ mixtures, the organic phase (blended bio-oil) layer was clearly flipped and on top, with the water phase on the bottom of the container. For the 2 M $MgCl_2$ mixture, the layers were partially flipped, and the layers were not flipped for the 1 M $MgCl_2$ mixture.

Example VII

A product mixture produced from the thermo-catalytic pyrolysis of southern yellow pine wood chips was collected and allowed to settle. The organic phase (raw bio-oil, pH of about 4.5, density of about 1.085) for the product mixture settled to a position below the product water phase (pH ~4-5). The product mixture was separated into six quantities. NaCl was added to five of the product mixture samples such that those five product water portions separately contained about 1 M NaCl, about 2 M NaCl, about 3 M NaCl, about 4 M NaCl, and about 5 M NaCl, respectively. For each of the 3 M, 4 M, and 5 M NaCl mixtures, the organic phase layer was clearly flipped and on top, with the product water phase on the bottom of the container.

Example VIII

A product mixture produced from the thermo-catalytic pyrolysis of southern yellow pine wood chips was collected and allowed to settle. The organic phase (raw bio-oil) for the product mixture settled to a position below the water phase, and had a TAN of 6.1. A 20.1 gram quantity of ammonium bicarbonate was combined with an 82 gram quantity of process water separated from the product mixture to form a modified water solution containing about 19.7 wt % ammonium bicarbonate. A 19.9 gram quantity of the modified water solution was combined with 91 grams of the raw bio-oil separated from the product mixture. The organic phase (raw bio-oil) layer was flipped and on top, with the modified water phase on the bottom of the container.

Example IX

Raw bio-oil was separated from a product mixture produced from the thermo-catalytic pyrolysis of southern yellow pine wood chips. The raw bio-oil had a TAN of 6.1; 3.2 vol % water (determined by the Karl Fischer titration method); and 5,000 ppm solids. A quantity of the raw bio-oil was blended with a quantity of a bio-naphtha fraction separated from the raw bio-oil by distillation to form a 50/50 blend (by volume). The 50/50 blend contained about 4.0 wt % BS&W (basic sediment and water). A quantity of the 50/50 blend was centrifuged, removing a major portion of the free water and solids, amounting to about 3 wt %, resulting in a centrifuged blend containing about 1.0 wt % BS&W. A quantity of the centrifuged blend was then neutralized with a 3 wt % NaOH aqueous solution to reduce the TAN to about 0 (no TAN measurable). For maximum dehydration, the neutralized blend was also treated at 2.5 kV/inch AC electricity following addition of 100 ppm of a demulsifier obtained from Croda, commercially available under the trade name Croda D510. The resulting neutralized blend contained about 0 wt % (trace) BS&W. Each of the 50/50 blend, the centrifuged blend, and the neutralized blend were tested for conductivity at various temperatures. Results of such tests are shown in Table 2 below.

TABLE 2

|  | "As Is" 50/50 Blend | Centrifuged Blend | Neutralized and Electrostatically Treated Blend |
| --- | --- | --- | --- |
| BS&W | ~4% | ~1% | ~0% |
| Temp. (F.) | Specific Conductivity (nS/m) | | |
| 80 | 1,150,000 | 296,667 | — |
| 90 | — | — | 67,333 |
| 120 | — | 373,333 | 88,667 |
| 160 | — | 502,000 | 120,667 |
| 200 | — | 590,000 | 139,333 |
| 240 | — | 702,667 | 140,667 |
| 280 | — | 826,667 | 133,333 |

As can be seen from the data in Table 2, the addition of a neutralizing base to the bio-oil/bio-naphtha blend, along with electrostatic treatment, results in a significant decrease in conductivity. Thus, rather than leading to an expected increase in conductivity, it was unexpectedly found that the addition of a base to the system actually reduced the conductivity.

Example X

Raw bio-oil was separated from a product mixture produced from the thermo-catalytic pyrolysis of southern yellow pine wood chips. A quantity of the raw bio-oil was blended with a quantity of an un-hydrotreated bio-naphtha fraction of the raw bio-oil to form a 50/50 blend (by volume), which was then stirred for 1 hour at 300 RPM. For each of the acid treatment tests, an 80 ml quantity of the blend was mixed with 20 ml of an aqueous acid solution, and blended for 15 seconds. The aqueous acid solutions were prepared by mixing the acids into process water produced in the thermo-catalytic pyrolysis of the wood chips. As a control, one of the tested samples was prepared using process water without added acid. The samples were placed in a 140 F water bath for 30 minutes. The samples were then filtered through a 0.2 μm PVDF membrane filter and tested for metals using inductively coupled plasma mass spectrometry (ICP-MS). The metals content results are shown in Table 3 below.

and allowed to settle into an oil phase and a process water phase. The process water phase was separated from the oil phase. The process water phase was then extracted with MIBK and produced a raffinate and an extract. MIBK was then separated (by distillation) from the extract which

TABLE 3

| Metal | Raw Bio-oil | 5% Sulfuric Acid | 5% Phosphoric Acid | Blank (No added Acid) | 5% Nitric Acid | 5% Glycolic Acid |
|---|---|---|---|---|---|---|
| Al | 98.5 | 0 | 1.147 | 8.27 | 0.1339 | 2.998 |
| Ca | 69 | 0.56 | 0.797 | 0.4383 | 0.4059 | 1.129 |
| Cl | 0.749 | 0.2386 | 0.3886 | 0.563 | 0.3327 | 0.2361 |
| Co | 0.0427 | 0.0705 | 0.1086 | 0.1128 | 0 | 0.0847 |
| Cr | 0.3501 | 0 | 0.0102 | 0 | 0.003 | 0.0063 |
| Cu | 0.1094 | 0 | 0.032 | 0.0556 | 0.0371 | 0.032 |
| Fe | 12.33 | 0.0507 | 0.2298 | 4.615 | 0.596 | 2.287 |
| K | 14.07 | 0.0057 | 0.0665 | 0.0096 | 0.0132 | 0.0354 |
| Mg | 20.71 | 0 | 0.0176 | 0.0092 | 0 | 0.012 |
| Mn | 8.44 | 0.2603 | 0.0999 | 0.0941 | 0 | 0.0043 |
| Mo | 0.0143 | 0 | 0.0222 | 0 | 0 | 0 |
| Na | 1.16 | 2.999 | 12.19 | 3.195 | 0.2063 | 3.083 |
| Ni | 0.1241 | 0.0507 | 0.0516 | 0.0395 | 0.0596 | 0.0654 |
| P | 64.3 | 0.3506 | 1.731 | 0.723 | 1.168 | 0.512 |
| S | 9.66 | 0 | 0 | 0 | 0 | 0 |
| Si | 9.68 | 0.0581 | 0.0597 | 0.0668 | 0 | 0 |
| Ti | 2.237 | 0.562 | 0.2747 | 0.809 | 0 | 0.562 |
| V | 3.139 | 0 | 0.2057 | 1.468 | 0.0351 | 1.444 |
| Zn | 1.269 | 0.0249 | 0.0634 | 0.182 | 0.0126 | 0.2116 |
| Total Metals | 315.885 | 5.2311 | 17.4955 | 20.6509 | 3.0034 | 12.7028 |

As can be seen from the test results in Table 3, contacting bio-oil, which contains metals, with an aqueous acid solution including the above acids results in a substantial lowering of the wt % of dissolved metals in the resulting treated bio-oil.

Example XI

Parameters of potential extraction solvents were evaluated for use in liquid-liquid extraction of bio-oil/water mixtures. Table 4 below sets out certain properties of four different solvents. As can be seen in Table 4, methyl isobutyl ketone (MIBK) and cyclopentyl methyl ether (CPME) have desirable properties for such liquid-liquid extraction, however, the use of cyclopentyl methyl ether is less desirable due to its high cost.

TABLE 4

| Parameter | Ethyl Ether | Ethyl Acetate | MIBK | CPME |
|---|---|---|---|---|
| Density (g/ml) | 0.713 | 0.897 | 0.800 | 0.860 |
| Boiling Point (° F.) | 94 | 171 | 241 | 223 |
| Solubility in Water (g/100 ml) | 6.9 | 8.3 | 1.8 | 1.1 |
| Dipole Moment (Debye) | 1.15 | 1.78 | 4.2 | 1.27 |
| Stability in Acidic conditions | Less stable, forms peroxides | Hydrolyzes to acetic acid and ethanol | Stable | Less stable, forms peroxides |
| Commercially available/Cost | Yes/Limited applicability due to excess volatility | Yes, $1850/MT | Yes, $2200/MT | No, Expensive specialty |

Example XII

A product mixture produced from the thermo-catalytic pyrolysis of southern yellow pine wood chips was collected formed recovered MIBK and a residue which was not solid but an oily liquid material. The results for the process water extraction are shown in Table 5 below. The recovered MIBK quantity was 35.9 grams less than the amount of MIBK added to the process water. It is assumed that most of the overall mass loss of 21.30 g was from MIBK. Assuming 21 g of MIBK were lost due to volatility, that leaves about 14.9 g of MIBK to account for. With a water solubility of 1.8 g/100 ml, the amount of MIBK in the raffinate is calculated as follows:

(749.3 g water)×(1 ml/g)×(1.8 g MIBK/100 ml water) ~13.5 g MIBK. This leaves ~1.4 g MIBK (14.9 g-13.5 g) in the residue.

TABLE 5

| | Mass | Carbon Mass in each fraction | Estimated organic compounds mass | Estimated pure water mass |
|---|---|---|---|---|
| Process Water (g) | 1013.6 | 123.9 | 229.2 | 784.4 |
| MIBK (g) | 528.4 | 380.4 | 528.4 | 0 |
| Total mass added (g) | 1542.0 | 504.3 | 757.5 | 784.4 |
| Raffinate (g) | 924.1 | 74.9 | 174.8 | 749.3 |
| Residue (g) | 94.6 | 62.7 | 94.1 | 0.5 |
| Recovered MIBK and volatiles (g) | 498.9 | 323.1 | 492.5 | 6.4 |
| Water separated from extract (g) | 3.1 | 0.2 | — | 3.1 |
| Final Total (g) | 1520.7 | 460.8 | 761.5 | 759.2 |
| % Recovery | 98.6 | 91.4 | 100.5 | 96.8 |
| Mass lost (g) | 21.3 | — | — | — |

As can be seen from the results in Table 5, a significant quantity of carbon containing compounds can be removed from the process water by extraction with MIBK and substantially all of the MIBK is recoverable from the process. Further quantities of MIBK can easily be recovered from the raffinate and/or the residue. Also, the wt % yield of residue from the organics present in the initial process water is calculated to be: 100×(94.1 g-1.4 g MIBK)/(229.2 g organics in the process water) ~40 wt %.

Example XIII

A product mixture produced from the thermo-catalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. The results for the total product mixture extraction are shown in Table 6 below. The recovered MIBK quantity was 78.9 grams less than the amount of MIBK added to the process water. It is assumed that most of the overall mass loss of 50.9 g was from MIBK. Assuming 50 g of MIBK were lost due to volatility, that leaves about 28.9 g of MIBK to account for. With a water solubility of 1.8 g/100 ml, the amount of MIBK in the raffinate is calculated as follows:

(677.5 g water)×(1 ml/g)×(1.8 g MIBK/100 ml water) ~12.2 g MIBK. This leaves ~16.7 g MIBK (28.9 g-12.2 g) in the residue.

TABLE 6

|  | Mass | Carbon Mass in each fraction | Estimated organic compounds mass | Estimated pure water mass |
| --- | --- | --- | --- | --- |
| Process Water (g) | 906.7 | 110.8 | 205.0 | 701.7 |
| Process Oil (g) | 109.0 | 74.2 | 98.9 | 10.0 |
| Process Water/Oil (g) | 1015.6 | 185.0 | 303.9 | 711.7 |
| MIBK (g) | 476.8 | 343.3 | 476.8 | 0.0 |
| Total mass added (g) | 1492.5 | 528.3 | 780.7 | 711.7 |
| Raffinate (g) | 838.4 | 67.0 | 160.9 | 677.5 |

TABLE 6-continued

|  | Mass | Carbon Mass in each fraction | Estimated organic compounds mass | Estimated pure water mass |
| --- | --- | --- | --- | --- |
| Residue (g) | 177.4 | 128.1 | 176.7 | 0.7 |
| Recovered MIBK and volatiles (g) | 425.8 | 299.6 | 397.9 | 27.9 |
| Final Total (g) | 1441.6 | 494.6 | 735.5 | 706.1 |
| % Recovery | 96.6 | 93.6 | 94.2 | 99.2 |
| Mass lost (g) | 50.9 | — | — | — |

As can be seen from the results in Table 6, a significant quantity of carbon containing compounds can be removed from the total product mixture by extraction with MIBK and substantially all of the MIBK is recoverable from the process. Further quantities of MIBK can easily be recovered from the raffinate and/or the residue. Also, the wt % yield of organics from the organics present in the initial process water portion of the total product mixture is calculated to be: 100×(176.7 g residue-98.9 g organics in process oil-16.7 g MIBK in residue)/(205 g organics in the process water) ~30 wt %.

Example XIV

Thermal stability of the bio-oil product is an extremely important processing parameter, since changes in the chemical and physical composition by thermal stress may create chemical changes (polymerization), viscosity changes and plugging issues (solids formation) in the upgrading units (such as hydrotreating units). A high oxygen product mixture produced from the thermo-catalytic pyrolysis of southern yellow pine wood chips was collected and allowed to settle, and a bio-oil stream was obtained. Also, a portion of the total product mixture was then extracted with MIBK and produced a raffinate and an extract. MIBK was then separated (by distillation) from the extract which formed recovered MIBK and a residue which was not solid but an oily liquid material. The resulting bio-oil stream and residue were separately subjected to a thermal stability study by heating the extracted oil in autoclave tubes, purged with Argon gas and immersed in a heated oil bath for 1 hr and 5 hrs, which is a more than typical residence time in heat exchangers and separation tanks. Table 7 shows results from the thermal stability test of the bio-oil stream and the residue.

TABLE 7

|  | Bio-Oil Stream | Bio-Oil Stream Heated 1 hr | Bio-Oil Stream Heated 5 hrs | Residue | Residue Heated 1 hr | Residue Heated 5 hrs |
| --- | --- | --- | --- | --- | --- | --- |
| Density, 60° F., g/cm$^3$ | 1.117 | 1.119 | 1.128 | 1.112 | 1.112 | 1.115 |
| Carbon, wt % | 68.14 | 68.18 | 67.58 | 72.18 | 71.54 | 71.50 |
| Hydrogen, wt % | 7.35 | 7.54 | 7.61 | 7.69 | 7.81 | 7.68 |
| Nitrogen, wt % | 0.22 | 0.19 | 0.23 | 0.19 | 0.29 | 0.17 |
| Water, wt % | 9.22 | 8.16 | 7.46 | 0.39 | 0.95 | 1.85 |
| Oxygen (dry basis), wt % | 17.73 | 18.33 | 19.40 | 19.67 | 19.70 | 19.37 |
| TAN, mg KOH/g | 80.46 | 80.83 | 51.86 | 102.8 | 95.86 | 70.69 |
| Viscosity, 25° C., cP | 110 | 214 | 621 | 1462 | 1540 | 2403 |
| Viscosity change | — | 94.4% | 465% | — | 5.3% | 64.4% |

As can be seen from Table 7, the % viscosity change for the MIBK produced residue is significantly lower than that for the bio-oil stream. This demonstrates a significant increase in stability for the residue over that for the typical bio-oil stream which has not been subjected to extraction. The initial viscosity of the residue is higher than that for the bio-oil stream due to the substantial absence of water and light (C1-C4) carbon containing compounds which are removed during the MIBK extraction.

Example XV

A product mixture produced from the thermo-catalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. The extract was then subjected to spinning/band distillation for separation of the residue from the MIBK. The results of such distillation are shown in Table 8 below. The results in Table 8 demonstrate that substantially all of the MIBK is removable from the extract.

TABLE 8

| Temp (° F.) | Fraction Collected | % MIBK distribution |
|---|---|---|
| 153.0 | 1 | 0.11 |
| 173.0 | 2 | 0.66 |
| 175.0 | 3 | 0.17 |
| 190.0 | 4 | 0.85 |
| 236.5 | 5 | 3.55 |
| 241.8 | 6 | 3.56 |
| 241.3 | 7 | 3.92 |
| 242.5 | 8 | 4.01 |
| 241.2 | 9 | 7.44 |
| 241.3 | 10 | 7.48 |
| 242.6 | 11 | 7.36 |
| 242.9 | 12 | 7.27 |
| 242.1 | 13 | 7.27 |
| 242.9 | 14 | 7.46 |
| 242.9 | 15 | 7.53 |
| 238.0 | 16 | 21.79 |
| 236.0 | 17 | 5.36 |
| | Residue Pot | 1.62 |
| | Recovery | 97.42 |

Example XVI

A product mixture produced from the thermo-catalytic pyrolysis of southern yellow pine wood chips was collected. The total product mixture was then extracted with MIBK and produced a raffinate 1 and an extract. MIBK was then separated (by distillation) from the extract which formed recovered MIBK and a residue which was not solid but an oily liquid material. The resulting raffinate 1 was then subjected to an extraction with MIBK to form a raffinate 2. The resulting raffinate 2 was then subjected to an extraction with MIBK to form a raffinate 3. The resulting raffinate 3 was then subjected to an extraction with MIBK to form a raffinate 4. The results of the extractions are shown in Table 9 below which shows that the low molecular weight oxygenate compounds (C1-C4) such as formaldehyde, acetaldehyde, butanone, acetic and propanoic acids and hydroxypropanone, are very soluble in water so they tend to stay in the water after MIBK extraction. This is preferred since hydrotreating such compounds would form C1-C4 alkanes that would end up in the gas phase. This would result in hydrogen consumption without the benefit of increasing renewable fuel yield.

TABLE 9

| Compound | Process Water | Raffinate 1 | 2 | 3 | 4 |
|---|---|---|---|---|---|
| Formaldehyde, wt % | 4.05 | 4.50 | 4.14 | 4.40 | 4.15 |
| Acetaldehyde, wt % | 1.28 | 0.88 | 0.56 | 0.53 | 0.38 |
| 2-Cyclopenten-1-one, wt % | 0.13 | 0 | 0 | 0.04 | 0 |
| Butanal, wt % | 0.03 | 0.10 | 0 | 0 | 0 |
| 2-Butanone, wt % | 0.20 | 0.12 | 0 | 0 | 0 |
| 3-Buten-2-one, wt % | 0.16 | 0.14 | 0.12 | 0.12 | 0.11 |
| Furfural, wt % | 0.07 | 0 | 0 | 0 | 0 |
| Methyl Isobutyl Ketone, wt % | 0.00 | 2.10 | 1.87 | 1.86 | 1.66 |
| Acetic Acid, wt % | 5.23 | 4.99 | 3.89 | 3.53 | 2.66 |
| Propanoic Acid, wt % | 0.79 | 0.49 | 0.27 | 0.16 | 0 |
| 1-Hydroxy-2-Propanone, wt % | 1.91 | 2.08 | 1.87 | 1.90 | 1.63 |

Example XVII

A product mixture produced from the thermo-catalytic pyrolysis of southern yellow pine wood chips was collected. The total product mixture was then extracted with MIBK and produced a raffinate 1 and an extract. The resulting raffinate 1 was then subjected to an extraction with MIBK to form a raffinate 2. The resulting raffinate 2 was then subjected to an extraction with MIBK to form a raffinate 3. Each of the extractions were at a volume ratio of MIBK to water of 25:75. Tables 10A-10C show partition coefficients for various components between the MIBK extract and the water which were calculated for raffinates 1 and 3 in accordance with the following: $K_d = [wt\%]_{MIBK\ Extract}/[wt\%]_{Raffinate}$. Values indicated as ">6" or ">5" are due to limits of detection of the GC/MS Analysis. The calculated $K_d$ values demonstrate that the lighter components such as formaldehyde, acetaldehyde, acetic acid and 1-hydroxy-2-propanone preferentially stay with the water (raffinate).

TABLE 10A

| Organic Compounds | $K_d$ 1$^{st}$ Extraction | $K_d$ 3$^{rd}$ Extraction |
|---|---|---|
| Formaldehyde | 0.16 | 0.01 |
| Acetaldehyde | 0.07 | 0.09 |
| 2-MethylFuran | >6 | >5 |
| 2-Cyclopenten-1-one | 19.34 | 1.65 |
| 2,5-Dihydrofuran | 6.00 | >5 |
| Butanal | 0.58 | >5 |
| 2-Butanone | 3.14 | 7.19 |
| Benzene | >6 | >5 |
| 3-Buten-2-one | 1.29 | 0.44 |
| 2,5-Dimethyl-Furan | >6 | >5 |
| Furfural | 17.50 | >5 |
| 2-Pentanone | 10.05 | 8.79 |
| Toluene | >6 | >5 |
| 2,3-Pentanedione | 6.21 | >5 |
| 5-HydroxymethylFurfural | >6 | >5 |
| Methyl Isobutyl Ketone | 37.83 | 51.33 |
| Acetic Acid | 0.68 | 0.67 |
| Ethylbenzene | >6 | >5 |
| (p + m)-Xylene | >6 | >5 |
| Propanoic Acid | 2.13 | 2.63 |
| o-Xylene | >6 | >5 |
| 1-Hydroxy-2-Propanone | 0.29 | 0.16 |
| Styrene | >6 | >5 |
| Isopropylbenzene | >6 | >5 |
| n-Propylbenzene | >6 | >5 |
| 2-Methyl-2-cyclope | 7.50 | >5 |
| 3-Ethyltoluene | >6 | >5 |
| 4-Ethyltoluene | >6 | >5 |
| 1,3,5-Trimethylbenzene | >6 | >5 |
| 2-Ethyltoluene | >6 | >5 |
| 1,2,4-Trimethylbenzene | >6 | >5 |
| Isobutyl benzene | >6 | >5 |

TABLE 10A-continued

| Organic Compounds | $K_d$ 1st Extraction | $K_d$ 3rd Extraction |
|---|---|---|
| 1,3-Benzodioxole | >6 | >5 |
| Benzofuran | >6 | >5 |

TABLE 10B

| Organic Compounds | $K_d$ 1st Extraction | $K_d$ 3rd Extraction |
|---|---|---|
| 1,2,3-Trimethylbenzene | >6 | >5 |
| Indane | >6 | >5 |
| Benzaldehyde | >6 | >5 |
| Indene | >6 | >5 |
| Phenol | 48.66 | >5 |
| 2,3-Dihydrobenzofuran | >6 | >5 |
| 2-Methylphenol | 12.08 | >5 |
| 2-ethyl-Phenol | >6 | >5 |
| 2-methyl-Benzofuran | >6 | >5 |
| 2-Methylbenzaldehyde | >6 | >5 |
| (p + m) Cresol | 22.44 | >5 |
| 2-methoxy-Phenol | >6 | >5 |
| 2-Methylindene | >6 | >5 |
| 2,5-dimethyl-Phenol | >6 | >5 |
| 3-ethyl-Phenol | >6 | >5 |
| 2,3-dimethyl-Phenol | >6 | >5 |
| Naphthalene | >6 | >5 |
| 4-ethyl-Phenol | >6 | >5 |
| 3,4-dimethyl-Phenol | >6 | 2.46 |
| 3-Methyl-1,2-benz diol | 32.27 | >5 |
| 2-methyl-Naphthalene | >6 | >5 |
| 1-methyl-Naphthalene | >6 | >5 |
| 1,2-Benzenediol | 18.52 | >5 |
| 2-Ethylnaphthalene | >6 | >5 |
| 4-Methyl-1,2-Benz diol | 119.53 | >5 |
| (+/−)-1-Indanol | >6 | >5 |
| Eugenol | >6 | >5 |
| 2,6-Dimethylnaphthalene | >6 | >5 |
| 4-Ethylcatechol | 30.01 | >5 |
| 1,3-Benzenediol | >6 | >5 |
| 1-Naphthalenol | >6 | >5 |
| Acenaphthene | >6 | >5 |
| Acenaphthylene | >6 | >5 |
| 1,4-Benzenediol | 30.85 | >5 |
| 2-Naphthalenol | >6 | >5 |
| Fluorene | >6 | >5 |
| 2-Methyl-1-naphthol | >6 | >5 |

TABLE 10C

| Organic Compounds | $K_d$ 1st Extraction | $K_d$ 3rd Extraction |
|---|---|---|
| Anthracene | >6 | >5 |
| Phenanthrene | >6 | >5 |
| Fluoranthene | >6 | >5 |
| Pyrene | >6 | >5 |
| Benz[a]anthracene | >6 | >5 |
| Chrysene | >6 | >5 |
| Benzo[b]fluoranthene | >6 | >5 |
| Benzo[k]fluoranthene | >6 | >5 |
| Benzo[a]Pyrene | >6 | >5 |
| Indeno[1,2,3-cd]pyrene | >6 | >5 |
| Benzo[ghi]perylene | >6 | >5 |
| Dibenz[a,h]anthracene | >6 | >5 |
| Levoglucosan | >6 | >5 |

Example XVIII

A low oxygen product mixture produced from the thermocatalytic pyrolysis of southern yellow pine wood chips was collected. The total product mixture was then extracted with MIBK and produced a raffinate and an extract. MIBK was then separated (by distillation) from the extract which formed recovered MIBK and a residue which was not solid but an oily liquid material. Concentrations of volatile organic components were measured using GC/MS for the product mixture and for the raffinate. Also, % C was also determined for such components. The results for the C1-C4 volatile organic components are shown in Table 11 below, and the results for the C5+ volatile organic components are shown in Tables 12A and 12B below. In addition, the total carbon content of the product mixture was analyzed and found to be 3.78 wt % C. By subtraction, the total amount of carbon from non-volatile organic components was 0.37 wt %.

TABLE 11

| | Product Mixture, wt % | Product Mixture, % C | Raffinate, wt % | Raffinate, % C |
|---|---|---|---|---|
| Formaldehyde | 0.39 | 0.15 | 0.54 | 0.22 |
| Acetaldehyde | 0.31 | 0.17 | 0.14 | 0.07 |
| 2-Cyclopenten-1-one | 0.03 | 0.02 | 0.00 | 0.00 |
| 2-Butanone | 0.02 | 0.01 | 0.00 | 0.00 |
| 3-Buten-2-one | 0.02 | 0.01 | 0.00 | 0.00 |
| Toluene | 0.01 | 0.00 | 0.00 | 0.00 |
| Methyl Isobutyl Ketone | 0.00 | 0.00 | 2.02 | 1.46 |
| Acetic Acid | 2.08 | 0.83 | 2.85 | 1.14 |
| (p + m)-Xylene | 0.01 | 0.00 | 0.00 | 0.00 |
| Propanoic Acid | 0.17 | 0.08 | 0.09 | 0.04 |
| 1-Hydroxy-2-Propanone | 0.05 | 0.02 | 0.00 | 0.00 |
| Total C4− volatiles | 3.09 | 1.29 | 5.64 | 2.93 |

TABLE 12A

| | Product Mixture, wt % | Product Mixture, % C | Raffinate, wt % | Raffinate, % C |
|---|---|---|---|---|
| 2-Methyl-2-cyclope | 0.01 | 0.01 | 0.00 | 0.00 |
| 4-Ethyltoluene | 0.01 | 0.00 | 0.00 | 0.00 |
| 1,2,4-Trimethylbenzene | 0.01 | 0.00 | 0.00 | 0.00 |
| Benzofuran | 0.01 | 0.00 | 0.00 | 0.00 |
| Indane | 0.01 | 0.00 | 0.00 | 0.00 |
| Indene | 0.01 | 0.00 | 0.00 | 0.00 |
| Phenol | 0.53 | 0.40 | 0.00 | 0.00 |
| 2-Methylphenol | 0.15 | 0.12 | 0.00 | 0.00 |
| 2-ethyl-Phenol | 0.01 | 0.01 | 0.00 | 0.00 |
| 2-methyl-Benzofuran | 0.01 | 0.00 | 0.00 | 0.00 |
| (p + m) Cresol | 0.33 | 0.26 | 0.00 | 0.00 |
| 2-Methylindene | 0.01 | 0.00 | 0.00 | 0.00 |

TABLE 12B

| | Product Mixture, wt % | Product Mixture, % C | Raffinate, wt % | Raffinate, % C |
|---|---|---|---|---|
| 2,5-dimethyl-Phenol | 0.07 | 0.06 | 0.00 | 0.00 |
| 3-ethyl-Phenol | 0.01 | 0.01 | 0.00 | 0.00 |
| 2,3-dimethyl-Phenol | 0.01 | 0.00 | 0.00 | 0.00 |
| Naphthalene | 0.01 | 0.00 | 0.00 | 0.00 |
| 4-ethyl-Phenol | 0.04 | 0.03 | 0.00 | 0.00 |
| 3,4-dimethyl-Phenol | 0.02 | 0.01 | 0.00 | 0.00 |
| 3-Methyl-1,2-benz diol | 0.16 | 0.10 | 0.00 | 0.00 |
| 2-methyl-Naphthalene | 0.03 | 0.02 | 0.00 | 0.00 |
| 1,2-Benzenediol | 0.87 | 0.57 | 0.00 | 0.00 |
| 2-Ethylnaphthalene | 0.01 | 0.00 | 0.00 | 0.00 |
| 4-Methyl-1,2-Benz diol | 0.25 | 0.17 | 0.00 | 0.00 |
| 2,6-Dimethylnaphthalene | 0.03 | 0.02 | 0.00 | 0.00 |
| 4-Ethylcatechol | 0.09 | 0.06 | 0.00 | 0.00 |
| 1,3-Benzenediol | 0.03 | 0.02 | 0.00 | 0.00 |

TABLE 12B-continued

|  | Product Mixture, wt % | Product Mixture, % C | Raffinate, wt % | Raffinate, % C |
|---|---|---|---|---|
| 1,4-Benzenediol | 0.15 | 0.10 | 0.00 | 0.00 |
| 2-Naphthalenol | 0.02 | 0.02 | 0.00 | 0.00 |
| 2,2-Bifuran | 0.04 | 0.03 | 0.00 | 0.00 |
| Methacrolein | 0.00 | 0.00 | 0.00 | 0.00 |
| 3-Pentanone | 0.00 | 0.00 | 0.00 | 0.00 |
| 2,5-Dihydrotoluene | 0.00 | 0.00 | 0.00 | 0.00 |
| 3-Penten-2-one | 0.00 | 0.00 | 0.00 | 0.00 |
| Cyclopentanone | 0.00 | 0.00 | 0.00 | 0.00 |
| Benzofuran, 7-methyl | 0.01 | 0.00 | 0.00 | 0.00 |
| 1-Methylindene | 0.01 | 0.01 | 0.00 | 0.00 |
| 1H-Indenol | 0.08 | 0.07 | 0.00 | 0.00 |
| Penten-3-one | 0.00 | 0.00 | 0.00 | 0.00 |
| 1,3-Dimethylindene | 0.01 | 0.00 | 0.00 | 0.00 |
| 2-Ethyl-5-methylphenol | 0.03 | 0.02 | 0.00 | 0.00 |
| Retene | 0.01 | 0.00 | 0.00 | 0.00 |
| Total C5+ volatiles | 3.09 | 2.12 | 0.00 | 0.00 |
| Total volatiles | 6.18 | 3.41 | 5.64 | 2.93 |

As can be seen in Tables 11, 12A and 12B the data show that extraction of a biomass derived product mixture with MIBK is effective in removing C5+ volatile organic components from water. Specifically, while the product mixture contained 2.12 wt % C from C5+ organic volatiles, the raffinate contained at or near 0 wt % C from C5+ organic volatiles showing clear partitioning from the water phase to the oil phase. Also, the wt % C from C1-C4 volatile organic components is concentrated in the raffinate at 2.93 wt % as compared to only 1.29 wt % in the initial product mixture.

Example XIV

In a continuous process, a first mixture was produced from the catalytic conversion of Southern Yellow Pine at temperatures between 530° C. and 580° C. wherein said first mixture comprises raw bio-oil and product water. This mixture was sampled, separated into an aqueous phase ("first mixture water phase") and an organic phase ("first mixture raw bio-oil phase") by centrifuge, and then each phase was analyzed. MIBK was continuously added to the first mixture to form a second mixture, targeting a volumetric ratio of the MIBK to the raw bio-oil ranging from 0.75 to 3. The second mixture was passed through a static mixer and fed into a decanting vessel where the lighter organic/MIBK phase ("second mixture oil/MIBK phase") was separated from the heavier aqueous phase ("second mixture aqueous phase"). Both phases were continuously removed from the vessel and samples were taken.

Each of the four phases (i.e., the first mixture raw bio-oil phase, first mixture water phase, second mixture organic/MIBK phase, and second mixture water phase) were analyzed by quantitative GC-MS to determine the amount of Organics A and Organics B in each sample. They were also analyzed by Karl-Fischer titration to determine the amount of water in each sample. Element analysis by LECO Corporation (St. Joseph, Mich.) was used to determine the carbon, hydrogen, and nitrogen in each sample; and oxygen was determined by the difference. Using the wet basis oxygen and the Karl-Fischer moisture results, a dry basis oxygen level for the oil phases was calculated. The amounts of solids in the organic phases were determined by filtration. The following are the completed measurements and balances for five runs, each of which is presented in one of Tables 13-17.

TABLE 13

| Sample | 1st Mixture Oil | 1st Mixture Water | 2nd Mixture Oil/MIBK | 2nd Mixture Aqueous |
|---|---|---|---|---|
| Water (wt. %) | 8.2 | 90.2 | 3.8 | 92.1 |
| Density at 60° F. (g/cc) | — | 1.03 | 0.93 | 1.02 |
| Oxygen (wt. %, dry) | 15.8 | — | 18.1 | — |
| Organics A (wt. %) | 3.2 | 7.9 | 2.9 | 6.6 |
| Organics B (wt. %) | 86.8 | 1.9 | 40.3 | 0.3 |
| MIBK (wt. %) | 0 | 0 | 53 | 1.0 |
| Solids by Filtration (wt %) | 1.8 | — | 0.03 | — |

TABLE 14

| Sample | 1st Mixture Oil | 1st Mixture Water | 2nd Mixture Oil/MIBK | 2nd Mixture Aqueous |
|---|---|---|---|---|
| Water (wt. %) | 7.7 | 91.2 | 4.2 | 92.3 |
| Density at 60° F. (g/cc) | 1.11 | 1.02 | 0.92 | 1.02 |
| Oxygen (wt. %, dry) | 13.9 | — | 16.0 | — |
| Organics A (wt. %) | 3.6 | 7.3 | 2.2 | 6.5 |
| Organics B (wt. %) | 87.5 | 1.5 | 35.6 | 0.2 |
| MIBK (wt. %) | 0 | 0 | 58 | 1.0 |
| Solids by Filtration (wt %) | 1.2 | — | 0.05 | — |

TABLE 15

| Sample | 1st Mixture Oil | 1st Mixture Water | 2nd Mixture Oil/MIBK | 2nd Mixture Aqueous |
|---|---|---|---|---|
| Water (wt. %) | 6.0 | 90.7 | 4.2 | 92.9 |
| Density at 60° F. (g/cc) | 1.12 | 1.01 | 0.91 | 1.06 |
| Oxygen (wt. %, dry) | 18.6 | — | 17.0 | — |
| Organics A (wt. %) | 3.3 | 7.6 | 1.9 | 5.8 |
| Organics B (wt. %) | 89.9 | 1.7 | 37.9 | 0.2 |
| MIBK (wt. %) | 0 | 0 | 55.8 | 1.2 |
| Solids by Filtration (wt %) | 0.8 | — | 0.02 | — |

TABLE 16

| Sample | 1st Mixture Oil | 1st Mixture Water | 2nd Mixture Oil/MIBK | 2nd Mixture Aqueous |
|---|---|---|---|---|
| Water (wt. %) | 7.8 | 85.5 | 4.9 | 88.3 |
| Density at 60° F. (g/cc) | 1.12 | 1.03 | 0.90 | 1.02 |
| Oxygen (wt. %, dry) | 18.7 | — | 17.7 | — |
| Organics A (wt. %) | 5.5 | 12.1 | 3.6 | 9.9 |
| Organics B (wt. %) | 86.7 | 2.4 | 34.4 | 0.4 |
| MIBK (wt. %) | 0 | 0 | 57 | 1.4 |
| Solids by Filtration (wt %) | — | — | 0.06 | — |

TABLE 17

| Sample | 1st Mixture Oil | 1st Mixture Water | 2nd Mixture Oil/MIBK | 2nd Mixture Aqueous |
|---|---|---|---|---|
| Water (wt. %) | 7.6 | 85.4 | 4.7 | 89.2 |
| Density at 60° F. (g/cc) | 1.11 | 1.04 | 0.90 | 1.02 |
| Oxygen (wt. %, dry) | 19.1 | — | 18.8 | — |
| Organics A (wt. %) | 5.9 | 12.1 | 2.9 | 9.1 |
| Organics B (wt. %) | 87.1 | 2.5 | 33.3 | 0.3 |

TABLE 17-continued

| Sample | 1st Mixture Oil | 1st Mixture Water | 2nd Mixture Oil/MIBK | 2nd Mixture Aqueous |
|---|---|---|---|---|
| MIBK (wt. %) | 0 | 0 | 60.2 | 1.4 |
| Solids by Filtration (wt %) | 0.4 | — | 0.06 | — |

Additionally, hydrocarbon phases (i.e., second mixture organic/MIBK phases) produced in the same manner as the samples in Tables 13-17 were fed to a packed bed distillation tower for recovery of the MIBK and water removal prior to hydrotreating. The distillation column separated nearly all of the MIBK from the hydrocarbon phases, thereby producing a bio-oil product comprising only about 5 wt % water and substantially free of MIBK.

While the technology has been particularly shown and described with reference to specific embodiments, it should be understood by those skilled in the art that various changes in form and detail may be made without departing from the spirit and scope of the technology as defined by the appended claims.

What is claimed is:
1. A method comprising:
a) contacting an extraction solvent with a first mixture to form a second mixture comprising an extract and a raffinate, said first mixture comprising process water that has been separated from reaction products comprising (1) bio-oil and (2) said process water, wherein said reaction products are produced from catalytic conversion of biomass at temperatures ranging from 300° C. to 1000° C., and wherein said process water comprises water and biomass derived carbon containing compounds including organics A and organics B, and further wherein:
said organics A comprise compounds selected from the group consisting of i) aldehydes, ii) ketones having from 3 to 4 carbon atoms per molecule, iii) carboxylic acids having from 2 to 3 carbon atoms per molecule, and iv) combinations thereof,
said organics B comprise compounds having at least four carbon atoms per molecule wherein said organics B are substantially free of: i) aldehydes, ii) ketones having from 3 to 4 carbon atoms per molecule, and iii) carboxylic acids having from 2 to 3 carbon atoms per molecule,
said extract and said raffinate are immiscible,
said extract comprises substantially all of said extraction solvent and substantially all of said organics B,
said raffinate comprises substantially all of said water and substantially all of said organics A, and
said extraction solvent has a dipole moment greater than about 1.0 debye, a density less than about 1.0, a water solubility at 20° C. of less than about 2.5 g/100 ml of water, and a boiling point in the range of from about 90 to about 300° F.;
b) separating said second mixture thereby forming an intermediate product stream comprising at least a portion of said extract and a waste water stream comprising substantially all of said raffinate, wherein said wastewater stream comprises less than about 0.5 wt % of said organics B; and
c) removing at least a portion of said extraction solvent from said intermediate product stream forming a recovered extraction solvent and a bio-oil product.

2. The method of claim 1 wherein the viscosity of said second mixture is lower than the viscosity of said first mixture, wherein said second mixture further comprises solids, and wherein at least a portion of said solids are removed from said second mixture by filtration prior to said step b).

3. The method of claim 1 wherein the partition coefficients of said organics A for said extract and said raffinate are each less than about 1.0, and wherein the partition coefficients of said organics B for said extract and said raffinate are each greater than about 1.0.

4. The method of claim 1 wherein said recovered extraction solvent is recycled as at least a part of said extraction solvent in step a).

5. The method of claim 1 wherein said bio-oil product comprises less than about 4 wt % of said organics A.

6. The method of claim 1 wherein said bio-oil of said reaction products comprises at least about 6 wt % water and wherein said bio-oil product comprises less than about 5 wt % water.

7. The method of claim 1 wherein said carbon containing compounds of said organics B have more than four carbon atoms per molecule and are selected from the group consisting of ketones, furans, phenols, catechols, aromatic hydrocarbons, indenols, indanols, naphthalenos, benzofurans, and combinations thereof.

8. The method of claim 1 wherein said extraction solvent comprises a member selected from the group consisting of methyl isobutyl ketone, cyclopentyl methyl ether, and combinations thereof.

9. The method of claim 1 wherein said extraction solvent comprises methyl isobutyl ketone.

10. The method of claim 1 wherein said intermediate product stream comprises substantially all of said extract.

11. The method of claim 1 wherein said first mixture is counter-currently contacted with said extraction solvent in step a).

12. The method of claim 1 wherein said first mixture is cross-currently contacted with said extraction solvent in step a).

13. The method of claim 1 wherein the contacting of said first mixture with said extraction solvent in step a) forms a static mixture, and wherein the separation of said second mixture in step b) is by decanting.

14. The method of claim 1 wherein said extraction solvent is substantially unreactive when exposed to acidic aqueous media and is substantially thermally stable at temperatures up to about 500° F.

15. A method comprising:
a) providing a first mixture comprising reaction products produced from catalytic conversion of biomass at temperatures ranging from 300° C. to 1000° C., said reaction products comprising water and biomass derived carbon containing compounds including organics A and organics B, wherein:
said organics A comprise carbon containing compounds selected from the group consisting of i) aldehydes, ii) ketones having from 3 to 4 carbon atoms per molecule, iii) carboxylic acids having from 2 to 3 carbon atoms per molecule, and iv) combinations thereof; and
said organics B comprise carbon containing compounds having at least four carbon atoms per molecule, wherein said organics B are substantially free of said organics A, and
wherein said first mixture includes i) a first oil phase comprising at least a portion of said biomass derived carbon containing compounds and at least a portion of said water and ii) a first aqueous phase comprising at least a portion of said water and at least a portion of said biomass derived carbon containing compounds, wherein said first oil phase and said first aqueous phase are immiscible;

b) contacting said first mixture with an extraction solvent thereby forming an extraction mixture comprising an extraction oil phase and an extraction aqueous phase; wherein:

substantially all of said organics A present in said first oil phase are partitioned from said first oil phase to said first aqueous phase and substantially all of said organics B present in said first aqueous phase are partitioned from said first aqueous phase to said first oil phase, thereby forming (I) said extraction oil phase comprising substantially all of said organics B and substantially all of said extraction solvent, and (II) said extraction aqueous phase comprising substantially all of said water and substantially all of said organics A, said extraction oil phase and said extraction aqueous phase are immiscible, and said extraction solvent has a dipole moment greater than about 1.0 debye, a density less than about 1.0, a water solubility at 20° C. of less than about 2.5 g/100 ml of water, and a boiling point in the range of from about 90 to about 300° F.; and c) separating said extraction mixture thereby forming an intermediate product stream comprising at least a portion of said extraction oil phase and a waste water stream comprising substantially all of said extraction aqueous phase, wherein said waste water stream comprises less than about 0.5 wt % of said organics B.

16. The method of claim 15 wherein at least a portion of said extraction solvent is removed from said intermediate product stream forming a recovered extraction solvent and a bio-oil product.

17. The method of claim 16 wherein said recovered extraction solvent is recycled as at least a part of said extraction solvent in step b).

18. The method of claim 16 wherein said bio-oil product comprises less than about 4 wt % of said organics A.

19. The method of claim 16 wherein said first oil phase comprises at least about 6 wt % water and wherein said bio-oil product comprises less than about 5 wt % water.

20. The method of claim 15 wherein the viscosity of said extraction mixture is lower than the viscosity of said first mixture, wherein said extraction mixture further comprises solids, and wherein at least a portion of said solids are removed from said extraction mixture by filtration prior to said step c).

21. The method of claim 15 wherein the partition coefficients of said organics A for said extraction oil phase and said extraction aqueous phase are each less than about 1, and wherein the partition coefficients of said organics B for said extraction oil phase and said extraction aqueous phase are each greater than about 1.

22. The method of claim 15 wherein said carbon containing compounds of said organics B have more than four carbon atoms per molecule and are selected from the group consisting of Ketones, Furans, Phenols, Catechols, Aromatics hydrocarbons, Indenols, Indanols, Naphthalenos, Benzofurans, and combinations thereof.

23. The method of claim 15 wherein said extraction solvent comprises a member selected from the group consisting of methyl isobutyl ketone, cyclopentyl methyl ether, and combinations thereof.

24. The method of claim 15 wherein said extraction solvent comprises methyl isobutyl ketone.

25. The method of claim 15 wherein said intermediate product stream comprises substantially all of said extraction oil phase.

26. The method of claim 15 wherein said first mixture is counter-currently contacted with said extraction solvent in step b).

27. The method of claim 15 wherein said first mixture is cross-currently contacted with said extraction solvent in step b).

28. The method of claim 15 wherein the contacting of said first mixture with said extraction solvent in step b) forms a static mixture, and wherein the separation of said extraction mixture in step c) is by decanting.

29. The method of claim 15 wherein said extraction solvent is substantially unreactive when exposed to acidic aqueous media and is substantially thermally stable at temperatures up to about 500° F.

* * * * *